United States Patent [19]

Fattouche et al.

[11] Patent Number: 5,282,222

[45] Date of Patent: Jan. 25, 1994

[54] METHOD AND APPARATUS FOR MULTIPLE ACCESS BETWEEN TRANSCEIVERS IN WIRELESS COMMUNICATIONS USING OFDM SPREAD SPECTRUM

[76] Inventors: Michel Fattouche, 156 Hawkwood Blvd. N.W., Calgary, Alberta, Canada, T3G 2T2; Hatim Zagloul, 402 - 1st Avenue, N.E., Calgary, Alberta, Canada, T2E 0B4

[21] Appl. No.: 861,725

[22] Filed: Mar. 31, 1992

[51] Int. Cl.$^5$ ............................................. H04K 1/00
[52] U.S. Cl. .......................................... 375/1; 380/34
[58] Field of Search .............................. 380/34; 375/1; 364/724.01, 827

[56] References Cited

U.S. PATENT DOCUMENTS

| | | |
|---|---|---|
| 4,601,005 | 7/1986 | Kilvington . |
| 4,623,980 | 11/1986 | Vary .................... 364/724 |
| 4,893,266 | 1/1990 | Deem . |
| 4,914,699 | 4/1990 | Dunn et al. ............. 375/1 X |
| 5,034,911 | 7/1991 | Rachels . |
| 5,063,560 | 11/1991 | Yerbury et al. ......... 375/1 X |
| 5,089,982 | 2/1992 | Gran et al. . |
| 5,151,919 | 9/1992 | Dent ....................... 375/1 |

OTHER PUBLICATIONS

Reduction of Multipath Fading Effects in Single Variable Modulations, M. A. Poletti and R. G. Vaughan, ISSPA 90 Signal Processing Theories, Implementations and Applications, Gold Coast, Australia 27-31 Aug., 1990, 672-676.

OFDM for Data Communication over Mobile Radio FM Channels; Part II: Performance Improvement[1] by E. F. Casas and C. Leung, Department of Electrical Engineering University of British Columbia, Vancouver, B.C., Canada V6T 1W5.

OFDM for Data Communication Over Mobile Radio FM Channels—Part I: Analysis and Experimental Results, Eduardo F. Casas and Cyril Leung, IEEE Transactions on Communications, vol. 39, No. 5, May 1991, pp. 783-793.

Performance of an RCPC-Coded OFDM-based Digital Audio Broadcasting (DAB) System, P. Hoeher, J. Hagenauer, E. Offer, Ch. Rapp, H. Schulze, Globecom'91, CH2980-1/91/0000-0040, pp. 0040-0046.

The Multitone Channel, Irving Kalet, IEEE Transactions on Communications, vol. 37, No. 2, Feb. 1989, pp. 119-124.

Optimized Decision Feedback Equalization versus Optimized Orthogonal Frequency Division Multiplexing for High-Speed Data Transmission Over the Local Cable Network, Nikolaos A. Zervos and Irving Kalet, CH2655-9/89/0000-1989 IEEE, p. 1080-1085.

(List continued on next page.)

Primary Examiner—Tod R. Swann
Attorney, Agent, or Firm—Daniel L. Dawes

[57] ABSTRACT

A method for allowing a number of wireless transceivers to exchange information (data, voice or video) with each other. A first frame of information is multiplexed over a number of wideband frequency bands at a first transceiver, and the information transmitted to a second transceiver. The information is received and processed at the second transceiver. The information is differentially encoded using phase shift keying. In addition, after a pre-selected time interval, the first transceiver may transmit again. During the preselected time interval, the second transceiver may exchange information with another transceiver in a time duplex fashion. The processing of the signal at the second transceiver may include estimating the phase differential of the transmitted signal and pre-distorting the transmitted signal. A transceiver includes an encoder for encoding information, a wideband frequency division multiplexer for multiplexing the information onto wideband frequency voice channels, and a local oscillator for upconverting the multiplexed information. The apparatus may include a processor for applying a Fourier transform to the multiplexed information to bring the information into the time domain for transmission.

12 Claims, 23 Drawing Sheets

OTHER PUBLICATIONS

Advanced Groupband Data Modem Using Orthogonally Multiplexed QAM Technique, Botaro Horosaki, Satoshi Hasegawa, and Akio Sabato, IEEE Transactions on Communications, vol. COM-34, No. 6, Jun. 1986, pp. 587–592.

A 19.2 Kbps voiceband data modem based on orthogonally multiplexed QAM techniques B. Hirosaki, A. Yoshida, O. Tanaka, S. Hasegawa, K. Inoue and K. Watanabe, CH2175-8/85/0000-0661, IEEE, pp. 661–665.

Analysis and Simulation of a Digital Mobile Channel Using Orthogonal Frequency Division Multiplexing, Leonard J. Cimini, Jr., IEEE Transactions on Communications vol. Com-33, No. 7, Jul., 1985, pp. 665–675.

An Orthogonally Multiplexed QAM System Using the Discrete Fourier Transform, Botaro Hirosaki, IEEE Transactions on Communications, vol. Com-29, No. 7, Jul. 1981, pp. 982–989.

An Analysis of Automatic Equalizers for Orthogonally Multiplexed QAM Systems Botaro Hirosaki, IEEE Transactions on Communications, vol. Com-28, No. 1, Jan. 1980, pp. 73–83.

An Improved Method for Digital SSB-FDM Modulation and Demodulation, Rikio Maruta and Atsushi Tomozawa, IEEE Transactions on Communications, vol. Com-26, No. 5, May 1978.

Data Transmission by Frequency-Division Multiplexing Using the Discrete Fourier Transform, S. B. Weinstein and Paul M. Ebert, IEEE Transactions on Communication Technology, vol. Com-19, No. 5, Oct., 1971, pp. 628–634.

Performance of an Efficient Parallel Data Transmission System, Burton R. Saltzberg, IEEE Transactions on Communication Technology vol. Com-15, No. 6, Dec., 1967, pp. 805–811.

A Theoretical Study of Performance of an Orthogonal Multiplexing Data Transmission Scheme, Robert W. Chang, Richard A. Gibby, IEEE Transactions on Communication Technology, vol. Com-16, No. 4, Aug., 1968, pp., 529–540.

Synthesis of Band-Limited Orthogonal Signals for Multichannel Data Transmission by Robert W. Chang, The Bell System Technical Journal, Dec. 1966, pp. 1775–1796.

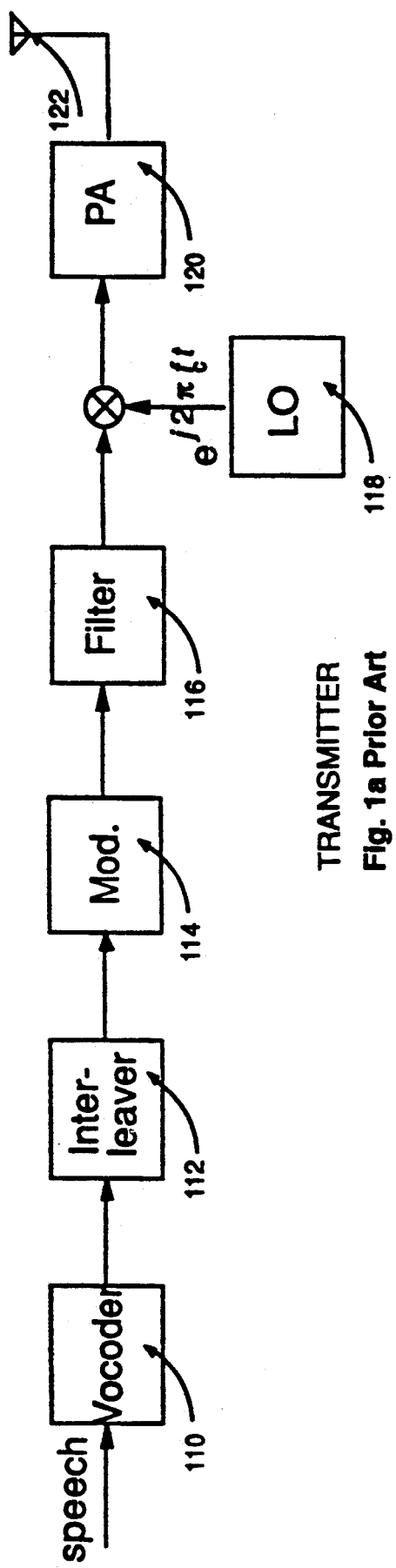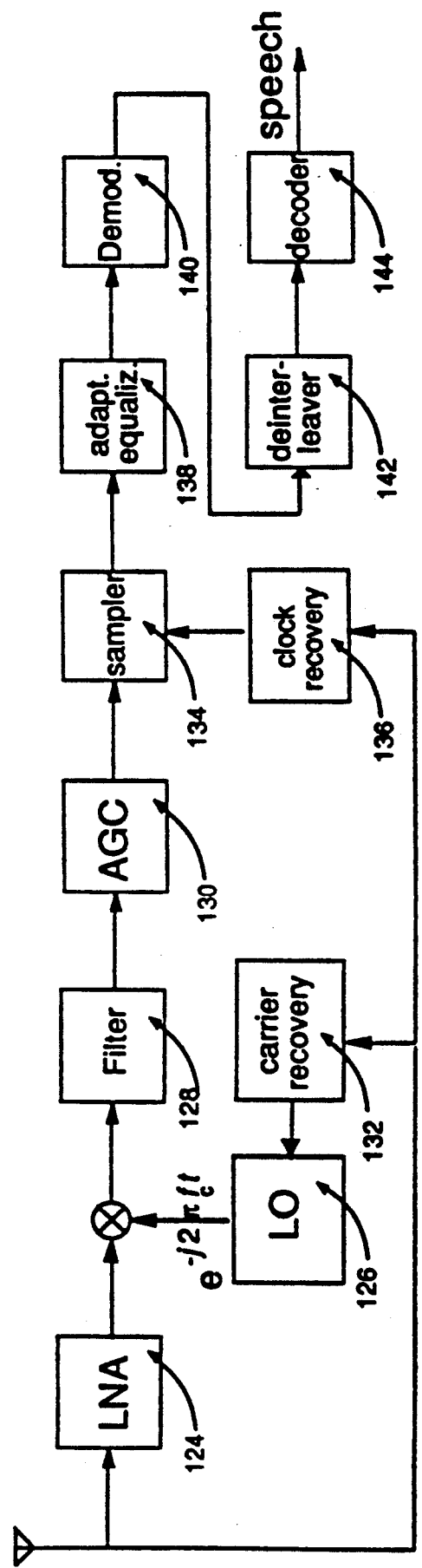
TRANSMITTER
Fig. 1a Prior Art
RECEIVER
Fig. 1b Prior Art 1 frame 40.96 μs
=1/24.414 KHz 1 frame 49.152 μs
=40.96 μs x 1.2

1 frame

52 μs
=39.152 μs + 2.848μs
Total # of frames = 252

Portable Transmits

Portable Receives

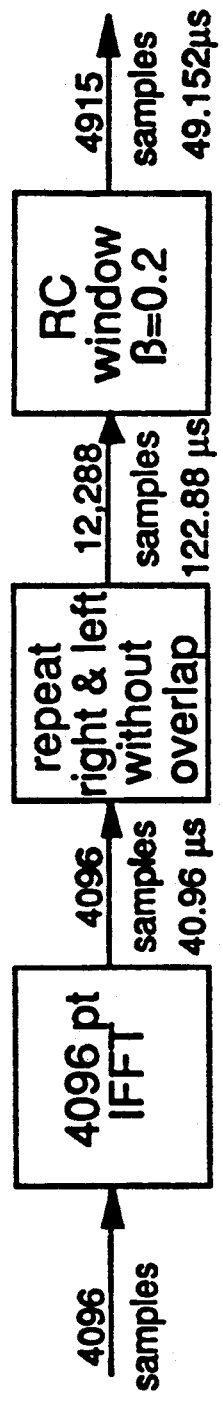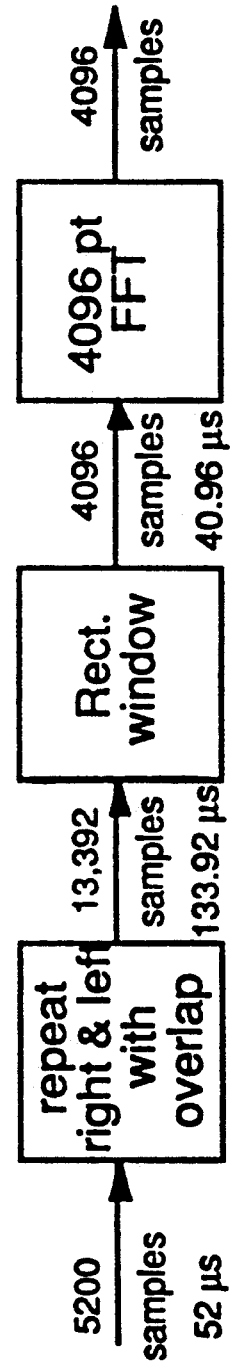
Fig. 6a Processor
Fig. 6b De-processor
† a sample above is a complex sample.

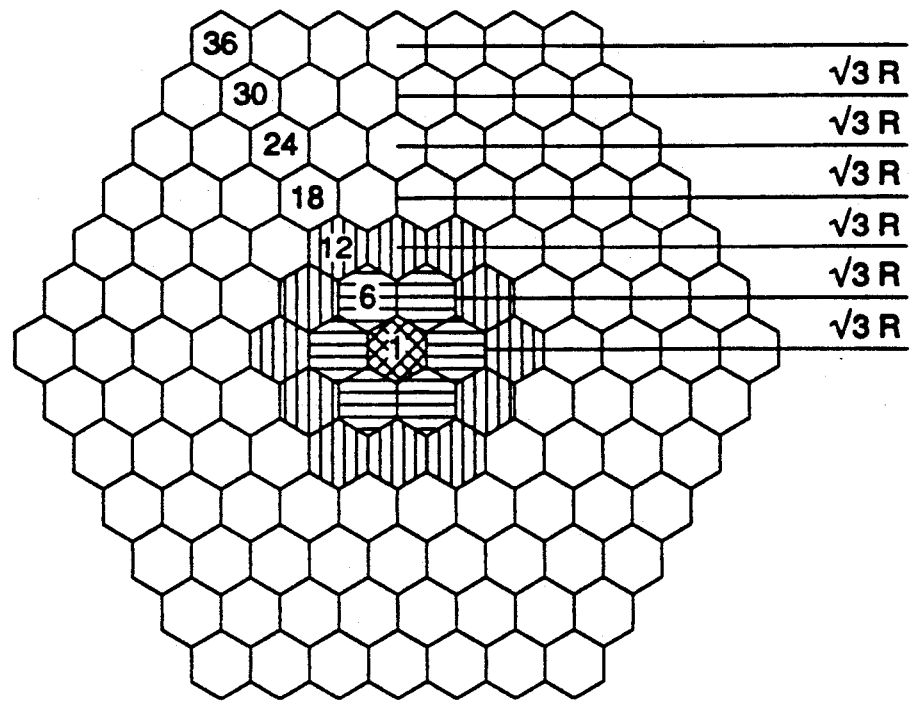
Fig. 8a
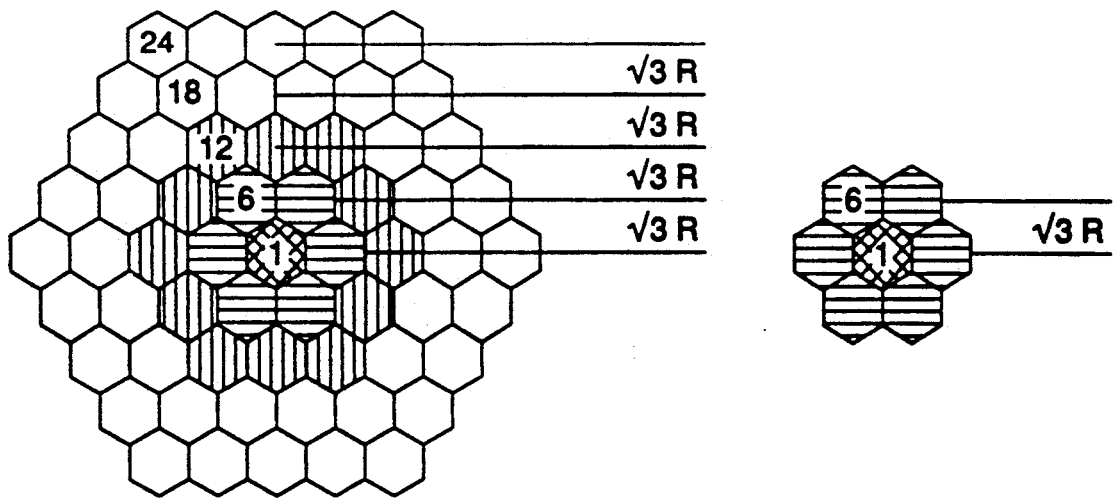
Fig. 8b
Fig. 8c

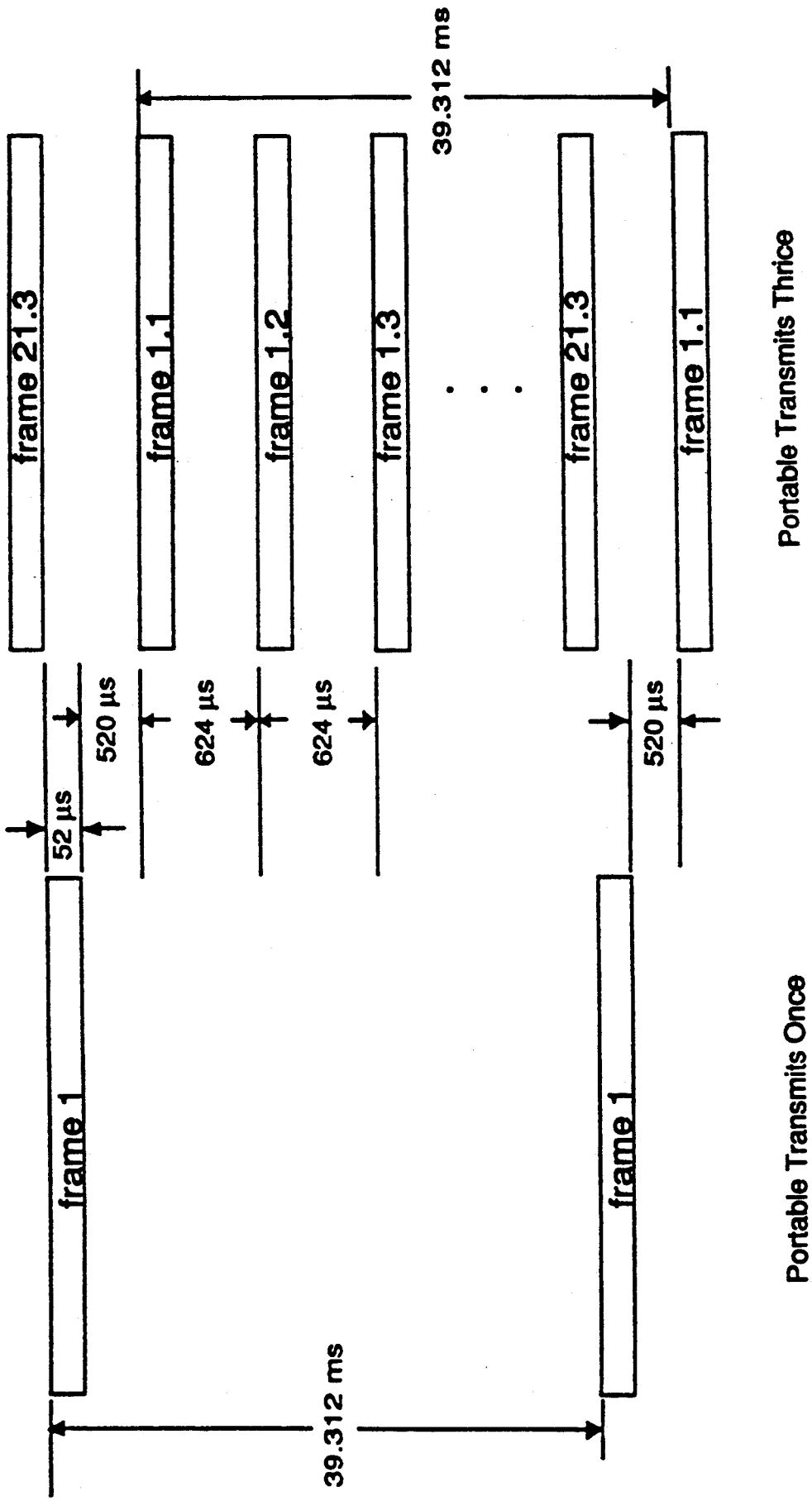

Wideband OFDM

First Transceiver Transmits

First Transceiver Receives

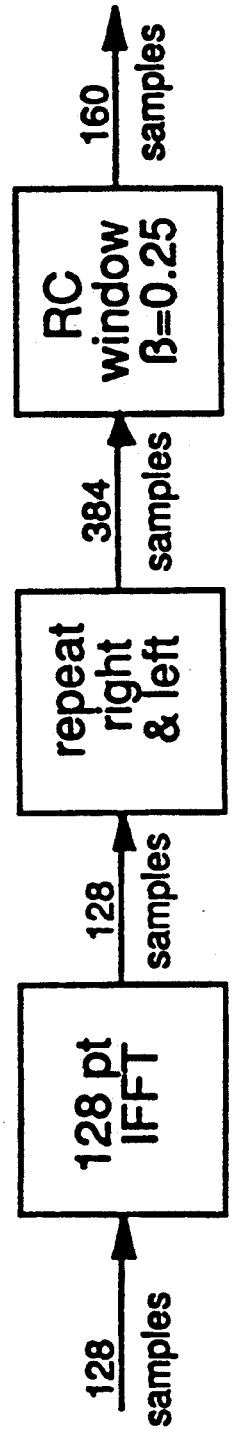
Fig. 14a — Processor
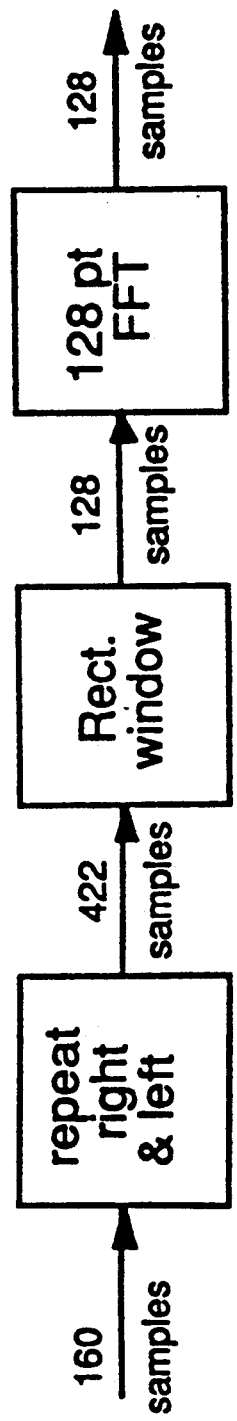
Fig. 14b — De-Processor

METHOD AND APPARATUS FOR MULTIPLE ACCESS BETWEEN TRANSCEIVERS IN WIRELESS COMMUNICATIONS USING OFDM SPREAD SPECTRUM

FIELD OF THE INVENTION

This invention relates to voice and data transmission in wireless communications, and particularly between fixed and portable transmitters and receivers.

CLAIM TO COPYRIGHT

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever. Software for carrying out some of the method described in this patent document has been filed with the Patent and Trademark Office in the form of a microfiche and includes 55 frames including a title frame.

BACKGROUND AND SUMMARY OF THE INVENTION

This patent document presents a new multiple access technique for Personal Communication Networks (PCN). Personal communication networks are networks that allow individuals and equipment to exchange information with each other anywhere at anytime through voice, data or video. PCN typically include a number of transceivers, each capable of transmitting and receiving information (voice, data or video) in the form of electromagnetic signals. The transceivers may be fixed or portable, and may be identical or one or more of them may be more complex.

The system must allow the transceivers to access each other to enable the exchange of information. When there are a number of transceivers, multiple access, that is, access by more than one transceiver to another transceiver, must be allowed.

One of the constraints of designing a PCN is that a transceiver, or portable radio unit, must be small in size. The smaller the unit, the better for portability. The small size of the units means only small and light-weight power sources can be used. If the portable is to be used for any length of time, it must therefore consume minimal power.

Also, to allow use of the radio frequency spectrum without obtaining a license in North America, the system must use a spread spectrum and satisfy federal regulations. In part, these regulations impose limits on the power and the frequency spread of the signals exchanged between the transceivers. An object of an aspect of this invention is to satisfy those requirements.

Also, transceivers talk to each other over a fixed bandwidth. Because of the limited availability of the RF spectrum, the system must be bandwidth efficient yet at the same time maintain high quality exchange of information at all times in one of the most hostile channels known in communication. The new multiple access technique proposed here addresses all these issues.

The new access technique has a low Bit Error Probability (BER) as well as a low probability of dropped and blocked calls. This is due to the fact that the access technique is robust against multipath, Doppler shifts, impulse noise and narrowband interference. It has a low cochannel interference and little or no intersymbol interference.

The new access technique can offer up to 38 times the capacity of analog FM. It includes in one aspect wideband orthogonal frequency division multiplexing of the information to be exchanged, and may include slow Frequency Hopping (FH). The technique is implemented using Digital Signal Processors (DSP) replacing conventional analog devices. The system operates with relatively small cells. In other aspects, dynamic channel allocation and voice activation may be used to improve the capacity of the system.

Advantages of the present invention include:

1. It can be used indoors as well as outdoors using the same transceivers. If data is to be exchanged, as opposed to voice, the transceiver preferably contains an estimator to allow pre-distortion and post-distortion of the transmitted signal.
2. The system, as compared with prior art systems omits the clock or carrier recovery, automatic gain control or passband limiter, power amplifier, an equalizer or an interleaver-deinterleaver, and therefore has low complexity.
3. The system offers good speech quality, as well as low probabilities of dropped and blocked calls. It is robust against Doppler and multipath shifts. It is also robust against both impulse noise and narrowband interference.
4. The system is flexible, such that at the expense of increased complexity of the DSP receiver it can be applied over noncontiguous bands. This is accomplished by dividing a 100 MHz (in one of the exemplary embodiments described here) band into several subbands each accommodating an integer number of voice channels.
5. The system offers low frame delay (less than 26.2 ms in the exemplary cellular embodiment described here). The transceiver requires low average transmitted power (of the order of 20 $\mu$W in the exemplary cellular embodiment described here) which means power saving as well as enhanced biological safety.
6. The system offers up to a 38 fold increase in capacity over the North American Advanced Mobile Phone System (AMPS) which uses analog frequency modulation.

Operation of the system in accordance with the techniques described in this disclosure may permit compliance with technical requirements for spread spectrum systems.

There is therefore disclosed in one aspect of the invention a method for allowing a number of wireless transceivers to exchange information (data, voice or video) with each other. In the method, a first frame of information is multiplexed over a number of frequency bands at a first transceiver, and the information transmitted to a second transceiver. In a cellular implementation, the second transceiver may be a base station with capacity to exchange information with several other transceivers. The information is received and processed at the second transceiver. The frequency bands are selected to occupy a wideband and are preferably contiguous, with the information being differentially encoded using phase shift keying.

A signal may then be sent from the second transceiver to the first transceiver and de-processed at the first transceiver. In addition, after a preselected time interval, the first transceiver transmits again. During the preselected time interval, the second transceiver may exchange information with another transceiver in a time duplex fashion.

The processing of the signal at the second transceiver ma include estimating the phase differential of the transmitted signal and predistorting the transmitted signal.

The time intervals used by the transceivers may be assigned so that a plurality of time intervals are made available to the first transceiver for each time interval made available to the second transceiver while the first transceiver is transmitting, and for a plurality of time intervals to be made available to the second transceiver for each time interval made available to the first transceiver otherwise. Frequencies may also be borrowed by one base station from an adjacent base station. Thus if one base station has available a first set of frequencies, and another a second set of distinct frequencies, then a portion of the frequencies in the first set may be temporarily re-assigned to the second base station.

In an implementation of the invention for a local area network, each transceiver may be made identical except for its address.

Apparatus for carrying-out the method of the invention is also described here. The basic apparatus is a transceiver which will include an encoder for encoding information, a wideband frequency division multiplexer for multiplexing the information onto wideband frequency voice channels, and a local oscillator for upconverting the multiplexed information. The apparatus may include a processor for applying a Fourier transform to the multiplexed information to bring the information into the time domain for transmission.

BRIEF DESCRIPTION OF THE DRAWINGS

There will now be described a preferred embodiment of the invention, with reference to the drawings, by way of illustration, in which like numerals denote like elements and in which:

FIGS. 1a and 1b are schematics of a prior art receiver and transmitter respectively;

FIG. 3b is a schematic showing a modified version of the pulse shown in FIG. 3a;

FIG. 3c is a schematic showing a further modified version of the pulse shown in FIG. 3a;

FIG. 6a is a flow diagram showing the function of the processor in either of FIGS. 5a or 5b;

FIG. 6b is a schematic showing the function of the deprocessor in either of FIGS. 5b or 5c;

FIG. 7b is a flow chart showing the operation of the channel estimator of FIGS. 5b and 7a;

FIGS. 8a, 8b and 8c are respectively schematics of 126, 63 and 7 cell reuse patterns;

FIGS. 9a and 9b are schematics showing transmit protocols according to one aspect of the invention;

FIG. 11a is a schematic showing an idealized pulse for transmission over a local network system;

FIG. 11b is a schematic showing a modified version of the pulse shown in FIG. 11a;

FIG. 11c is a schematic showing a further modified version of the pulse shown in FIG. 11a;

FIG. 14a is a flow diagram showing the function of the processor in either of FIGS. 13a or 13b;

FIG. 14b is a schematic showing the function of the deprocessor in either of FIGS. 13b or 13c;

DETAILED DESCRIPTION OF PREFERRED EMBODIMENTS

Introduction

Figure 2:
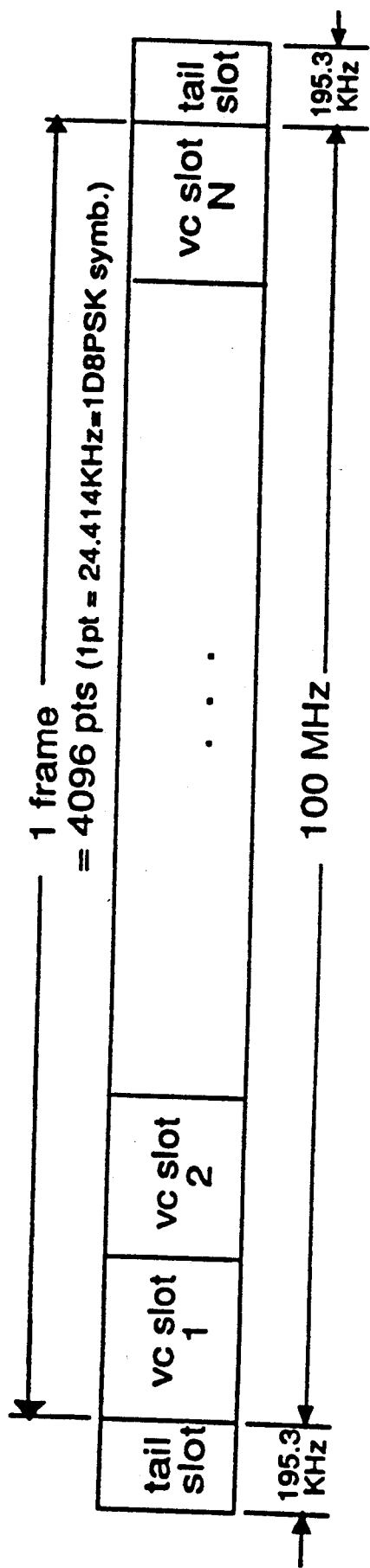
FIG. 2 is a schematic showing the use of the available frequencies according to one aspect of the invention for use with cellular applications.

The benefits of the invention can be readily appreciated with reference to FIG. 1, which shows a prior art transmitter/receiver configuration for a portable unit. The transmitter includes a vocoder 110, an interleaver 112, a modulator 114, a filter 116, local oscillator 118, power amplifier (PA) 120 and antenna 122. The receiver includes an LNA 124, a local oscillator 126, a filter 128, automatic gain control (AGC) 130 with an associated passband hardlimiter not separately shown, carrier recovery 132, sampler 134, clock recovery 136, adaptive (or fixed) equalizer 138, demodulator 140, deinterleaver 142 and decoder 144. With implementation of the present invention, several of the blocks shown in FIG. 1 are not required. These are the interleaver 112, deinterleaver 142, power amplifier 120, automatic gain control 130 with passband hard-limiter, clock recovery 136 and carrier recovery 132, and the equalizer 138. It will now be explained how the proposed system obtains the omission of these blocks without impairing the quality and capacity of the system.

In this disclosure there will be described two systems as examples of the implementation of the invention. The system described first here will apply to a cellular system with a number of portable transceivers and base stations (BS). Then will be described a local area network implementation. A local area network will typically be a system of equal transceivers. The invention may also be implemented with combinations of cellular and local area networks, or to a system with a number of equal transceivers and a master or controlling transceiver. "Equal" as used here means that the transceivers have more or less the same processing equipment and processing capabilities. The system described here is primarily for the exchange of voice information.

Link set-up and termination protocols between transceivers, and the equipment required to implement them, are well understood in the art as well as the basic structure of radio transceivers that may be used to implement the invention. Hence these elements are not described here. What is described here are the novel operational, functional and structural elements that constitute the invention.

Cellular Implementation of Wideband Modulation

The present invention proposes in one embodiment a wideband modulation scheme for exchange of information between transceivers such as portables and base stations.

Wideband in this patent document is described in the context of Wideband-Orthogonal Frequency Domain Modulation (W-OFDM or wideband OFDM). In OFDM, the entire available bandwidth B is divided into a number of points K, where adjacent points are separated by a frequency band $\Delta f$, that is $B = K\Delta f$. The K points are grouped into a frame of $K_1$ points and two tail slots of $K_2$ points each, so that $K = K_1 + 2K_2$. The frame carries the information intended for transmission under the form of multilevel differential phase shift keying (MDPSK) symbols or differential quadrature amplitude modulated (DQAM) symbols. Thus each point in the frame corresponds to one information symbol. The two tail slots act as guard bands to ensure that the out-of-band signal is below a certain power level. For example, when a pulse P(f) is selected for pulse shaping and the out-of-band signal has to be ydB or less relative to the in-band signal, $K_2$ is selected such that $$20 \cdot \log_{10}|P(f)/P(0)| \leq y \text{ for } f \geq K_2 \Delta f.$$

When the pulse is a raised-cosine pulse with a roll-off $\beta$ and when the number of levels each symbol can take is M, the bit rate is equal to $K_1 \log_2 M / (\delta t + (1 + \beta)/\Delta f)$ where $(1+\beta)/\Delta f$ is the duration of the frame and $\delta t$ is the guard time required to take into account the delay of arrival and the delay spread due to multipath. In this case, the bandwidth efficiency, which is defined as the ratio between the bit rate and the bandwidth, is equal to:

$$\log_2 M / ((1+\beta+\delta t \Delta f)(1+2K_2/K_1))$$

In wideband-OFDM, both K and $\Delta f$ are selected sufficiently large to achieve a high throughput as well as to reduce the effects on the BER of the clock error, the Doppler shift and the frequency offset between the LO in the transmitter and the one in the receiver. To show what is meant by "K and $\Delta f$ are selected sufficiently large", consider the effect of increasing K and $\Delta f$ on (1) the clock error, (2) the Doppler shift and (3) the frequency offset between the LO in the transmitter and the LO in the receiver.

(1) When a clock error at a transceiver of value $\tau$ occurs in the time domain, it causes a shift in the phase difference between adjacent symbols in the frequency domain of value $2\pi\Delta f\tau$. When $\tau$ is equal to $\chi T$ where T is duration of one time domain sample and $\chi$ is any real value, the shift is equal to $2\pi\Delta f\chi T$. Hence, $\tau$ causes a shift in the phase difference between adjacent symbols of value $2\pi\chi/K_1$ since T is equal to $1/(K_1\Delta f)$. By doubling the number of symbols from $K_1$ to $2K_1$ the shift in the phase difference is reduced by half from $2\pi\chi/K_1$ to $\pi\chi/K_1$. Thus, the effect of the clock error on the BER is reduced by increasing K.

(2) When there is relative motion between the transmitting transceiver and the receiving transceiver, a Doppler shift occurs with a maximum absolute value $|V/\lambda|$ where V is the relative velocity between the two transceivers and $\lambda$ is the wavelength of the travelling wave corresponding to the carrier frequency $f_c$ (i.e. $f_c$ is the frequency corresponding to the middle point in the frame). Such a Doppler shift causes a sampling error in the frequency domain of the same amount, or equivalently, it causes a sampling error of $V/(\lambda\Delta f)$ relative to one symbol sample. Thus, the effect of the Doppler shift on the BER is reduced by increasing $\Delta f$.

(3) When a frequency offset between the LO in the transmitter and the one in the receiver occurs with a value $f_o$, it causes a sampling error in the frequency domain of the same amount, or equivalently, it causes a sampling error of $f_o/\Delta f$ relative to one symbol sample. Thus, the effect on the BER of the frequency offset between the LO in transmitter and the one in the receiver is reduced by increasing $\Delta f$.

In summary, OFDM with a K and a $\Delta f$ large enough to be able to achieve a specific throughput and large enough to be able to avoid using either a clock or a carrier recovery device without substantially affecting the BER is referred to here as Wideband-OFDM. As an example, let us assume that MDPSK is used in an OFDM system with the number M of levels, with a carrier frequency $f_c$, with a raised cosine pulse of roll-off $\beta$, with the LO at the receiver having a frequency offset $f_o$ relative to the LO at the transmitter (so that the frequency offset between the carrier frequencies in the first and second transceivers of the multiplexed information is $f_o$), with a given maximum expected clock error $\tau = \chi T$ at the receiving transceiver, where T is the duration of one time domain sample, and with a maximum expected relative velocity V between the transceivers. Thus, in order to ensure that the out-of-band signal is ydB or less relative to the in-band signal and to be able to avoid using either a clock or a carrier recovery device without substantially affecting the BER we have to:

1. Find the acceptable sampling error $\Delta f'$, relative to one symbol sample, which does not substantially affect the BER. This can be done using the following rules:

When $0.2 \leq \beta \leq 0.3$, $\Delta f' = 7.50\%$

When $0.3 \leq \beta \leq 0.4$, $\Delta f' = 10.0\%$

When $0.4 \leq \beta \leq 0.5$, $\Delta f' = 12.5\%$

When $0.5 \leq \beta \leq 0.6$, $\Delta f' = 15.0\%$

2. Find $\Delta f$ such that:

$$V/(\lambda\Delta f) + f_o/\Delta f \leq \Delta f'$$

3. Find $K_2$ such that $20 \cdot \log_{10}|P(f)/P(0)| \leq y$ for $f \geq K_2 \sigma_f$ 4. Find $K_1$ such that $2\pi\chi/K_1 < \pi/M$ In this case, we refer to OFDM as Wideband-OFDM. Element 4 is a necessary condition for wideband OFDM, and given a sampling error, the sampling error may be corrected with the methods described in this patent document.

To implement wideband modulation, Orthogonal Frequency Division Multiplexing (OFDM) is preferred in which the information, for example encoded speech, is multiplexed over a number of contiguous frequency bands. Wideband OFDM forces the channel to be frequency selective and causes two types of linear distortion: amplitude distortion and phase distortion. To reduce the effect of amplitude distortion the modulation is preferably phase modulation, while the effect of phase distortion is reduced by employing differential phase modulation. Hence the modulation may be referred to as Differential OFDM (DOFDM). Unlike in other proposed schemes, neither pilot tones nor diversity are required in DOFDM. Possibly, quadrature amplitude modulation might be used, but amplitude modulation makes it difficult to equalize the distorting effects of the channel on the signal.

To implement wideband modulation in a cellular system with a plurality of portables and one or more base stations, a 100 MHz band is divided into 4096 points, as shown in FIG. 2, plus two tail slots of 195.3 KHz each. The 4096 points represent N voice channels (vc). Adjacent points are separated by 24.414 KHz and each point represents a Differential eight Phase Shift Keying (D8PSK) Symbol $e^{j\zeta(n)}$, where $\zeta(n)= \zeta(n-1)+\phi(n)+\chi(n)$. $\phi(n)$ takes one of the eight values $\{0, 2\pi/8, 4\pi/8, \ldots 14\pi/8\}$ with equal probability for $n=1, 2, \ldots, 4096$ and $\phi(0)$ takes an arbitrary value. $X(n)$ also takes an arbitrary value. $\chi(n)$ may be used as a security key and will be known only to the transmitter and receiver. Information in the form of output bits from a vocoder are mapped onto $\phi(n)$. Vocoders are well known in the art and do not need to be described in detail here. The focus here is to transmit the bits with an acceptable Bit Error Rate, i.e. with a BER $\leq 10^{-2}$ for voice and $\leq 10^{-8}$ for data.

Figure 3A:
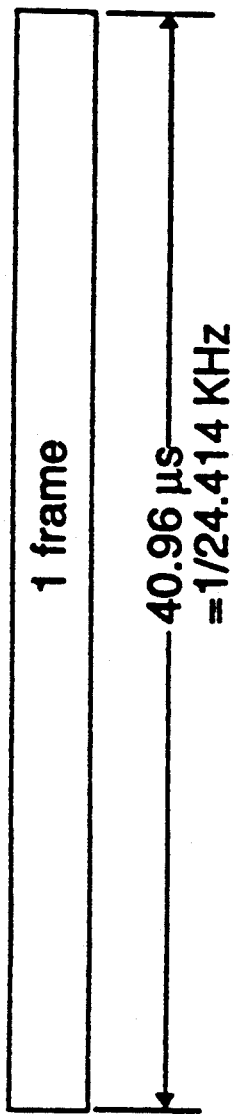
FIG. 3a is a schematic showing an idealized pulse for transmission over a cellular system.
Figure 3B:
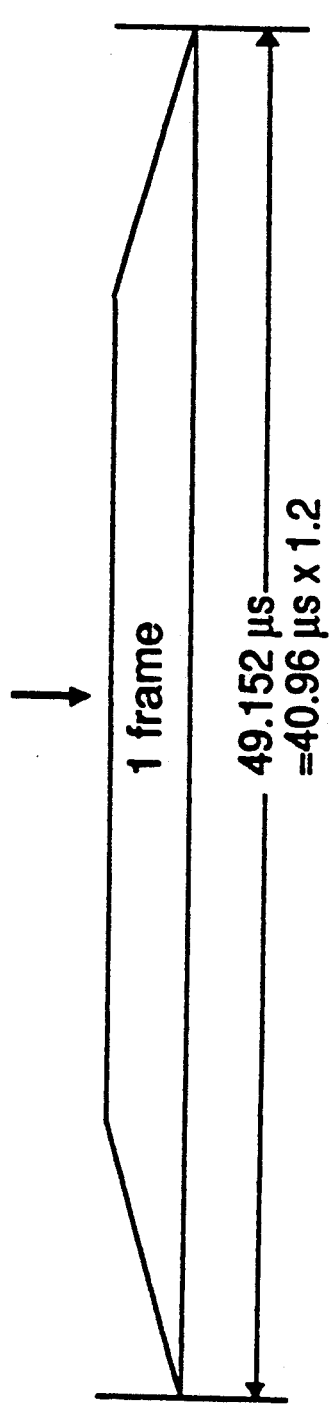
Figure 3C:
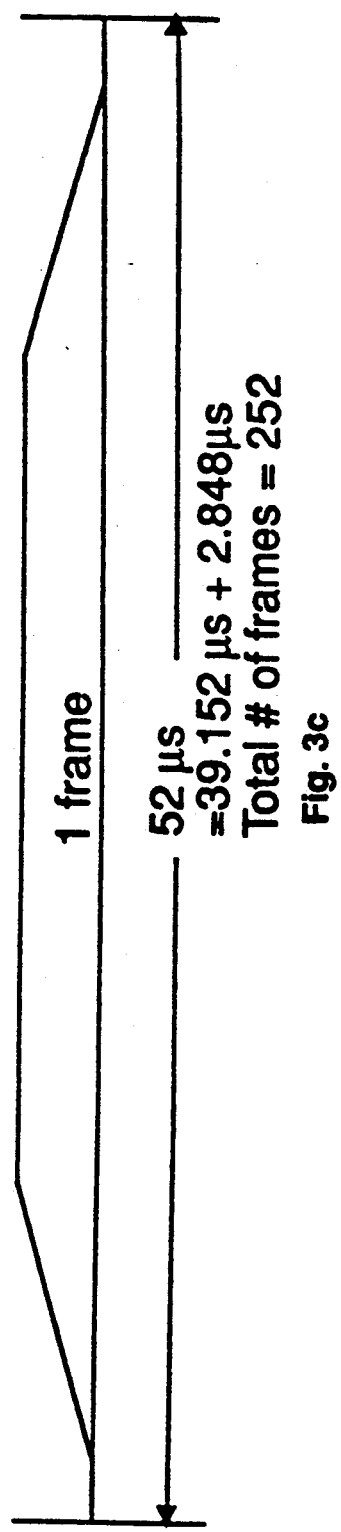

Ideally, 40.96 $\mu s$ (=1/24.414 KHz) is the minimum duration required for one frame to be transmitted without frequency domain intersymbol interference. This can be achieved using a Raised Cosine (RC) pulse with zero roll-off, as shown in FIG. 3a. FIG. 3a illustrates a rectangular (time domain) window corresponding to the RC (frequency domain) pulse. Such a pulse, however, requires an infinite frequency band. To alleviate such a requirement, an RC pulse with a 20% roll-off (i.e. $\beta =0.2$) may be used as shown in FIG. 3b. The frame duration has increased by 20% to 49.152 $\mu s$. The two tail slots of 195.3 KHz each (i.e. 8 points each) ensure that the signal outside the entire band of 100.39 MHz is below $-50$ dB. To allow the frame to spread over the time as a consequence of the multipath nature of the channel, an excess frame duration of 2.848 $\mu s$ is provided as shown in FIG. 3c, making the frame duration 52 $\mu s$ in total.

Since the frame duration is 52 $\mu s$, the frame rate is 252 frames per 13.104 ms or equivalently, 126 full duplex frames may be transmitted/received every 13.104 ms. The reason for pre-selecting an interval of 13.104 ms is to ensure a transmission delay to allow one transceiver to communicate with other transceivers at the same time, but must not be so long that the delay becomes unacceptable to the user. Delays longer than about 40 ms are too great for voice, and it is preferable to be lower. For data, the delay may be longer and still be acceptable.

In the exemplary embodiment described here, three bit rates are considered for the vocoder: 18.77 Kbps, 9.16 Kbps and 6.18 Kbps. Table I displays the structure of a vc slot and the number N of vc for each vocoder rate. The control symbols in each vc slot are required for handoff and power control. FIG. 2 shows that N vc can be transmitted simultaneously. This is known as Frequency Division Multiple Access. FIG. 3c shows that 126 full duplex frames can be transmitted every 13.104 ms in a Time Division Multiple Access fashion (TDMA). The total number of Full Duplex voice channels (FDvc) is therefore $126 \times N$ and is shown in Table I.

Figure 4:
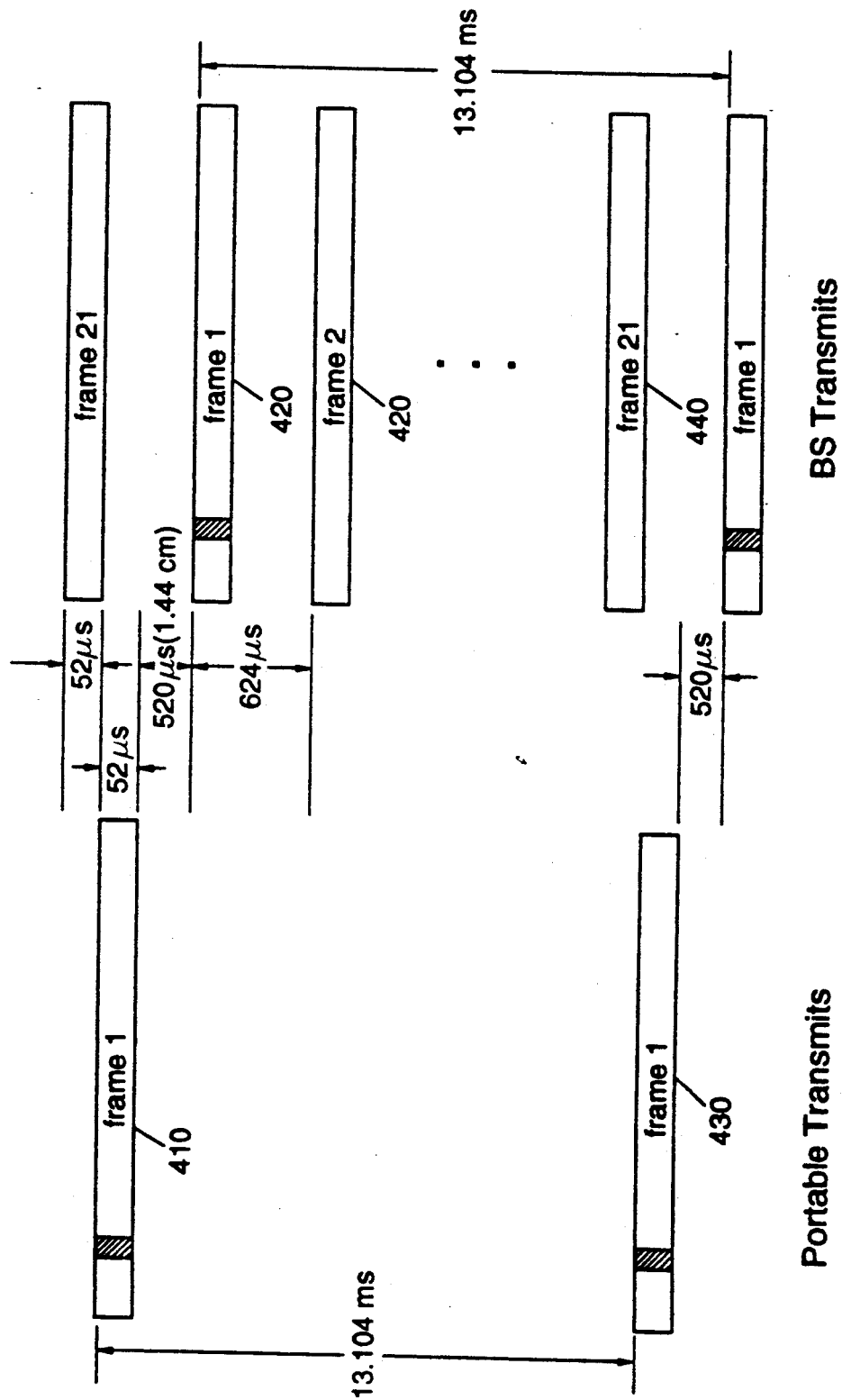
FIG. 4 is a schematic showing an exemplary protocol for cellular communication.

To ensure that the channel is slowly fading, a Time Division Duplex protocol for exchange of information between the portable and the base station is proposed as illustrated in FIG. 4. The protocol is as follows:

1. The portable transmits a frame 410 over one vc slot. See the discussion in relation to FIG. 5a below.
2. The Base Station (BS) receives the frame 410 from the portable and processes (analyzes) it as shown and discussed in relation to FIG. 5b below.
3. Based on the received signal, the BS predistorts a frame 420 and transmits it to the portable over the same vc slot, 520 $\mu s$ or some other suitable time interval later in which the channel does not change substantially. The time interval will depend on factors such as the frequency, speed of the transceiver and other environmental factors.
4. The portable receives the frame from the BS. See the discussion in relation to FIG. 5c below.
5. Steps 1 through 4 are repeated, as for example by the transmission of the next frame 430, every 13.104 ms until the call is terminated.

During 520 $\mu s$, a portable travelling outdoor at 100 km/hr moves 1.44 cm, which leaves the outdoor channel largely unchanged. Indoors, a portable moving at 2 m/s moves 0.1 cm again leaving the channel unchanged. Assuming that the channel is reciprocal and stationary over 520 $\mu s$, a predistorted signal, transmitted by the BS, should reach the portable undistorted.

From FIG. 4, one can see that the portable transmits/receives one FDvc every 13.104 ms, while the BS can transmit/receive up to 21 frames or equivalently up to $21 \times N$ FDvc every 13.104 ms. The frames 440 labelled frame 2 . . . frame 21 are frames that may be transmitted to other portables. This implies that while one BS is processing its data over 520 $\mu s$, six other BS can communicate to their corresponding portables in a Time Division Multiple Access (TDMA) fashion using the same frequency bands. Also, during the 13.104 ms, or such other preselected time interval that is suitable, the BS may communicate with one or more other portables.

When a portable is stationary during a call, it is possible with high probability to have the transmitted signal centered with several deep (frequency domain) nulls, hence, causing speech degradation. Also, narrowband interference over the vc slot can deteriorate the speech. In order to avoid both situations, the signal is preferably frequency hopped into a new vc slot within the same (frequency domain) frame. This frequency hopping is ordered by the BS which is constantly monitoring the channel frequency response. Monitoring techniques, as well as frequency hopping, are known in the art, and not described here further. When an unacceptable speech degradation is first noticed by the BS a probation period is initiated and maintained for at least 10 cycles (i.e. 10×13.104 ms) unless speech degradation has ceased. In other words, the probation period is terminated if speech degradation has ceased. Frequency hopping is then ordered at the end of the probation period. The period of 10 cycles is long enough to indicate the portable stationarity and is short enough to allow speech interpolation between unacceptable speech frames, hence maintaining good speech quality. As known in the art, the BS ensures that no collisions take place between hopping portables.

Digital Signal Processing

Figure 5A:
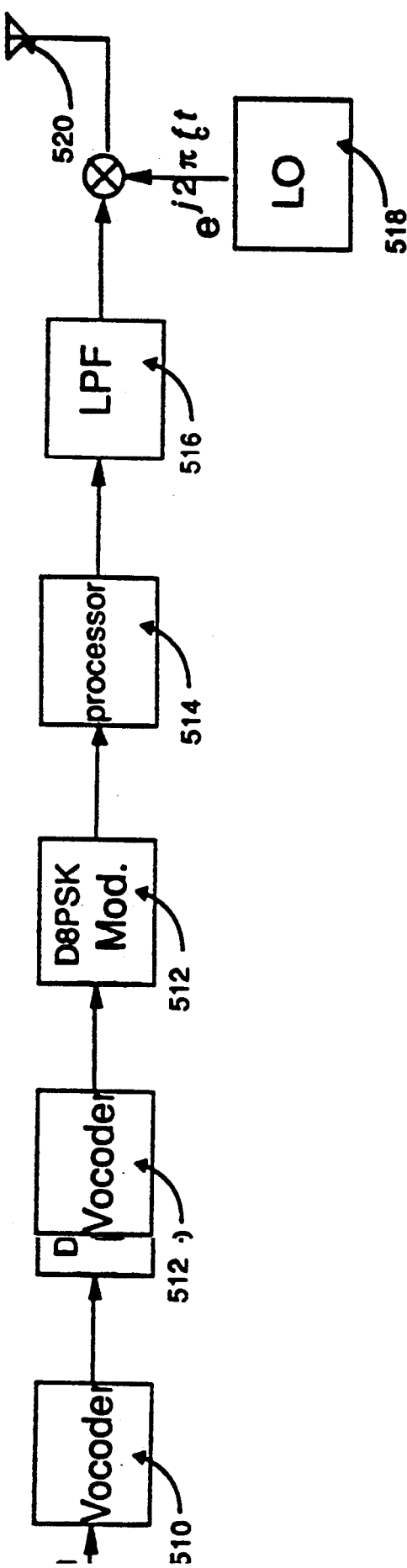
FIG. 5a is a block diagram showing the structure and function of an embodiment of the transmitter of a cellular portable in accordance with the invention.
Figure 5B:
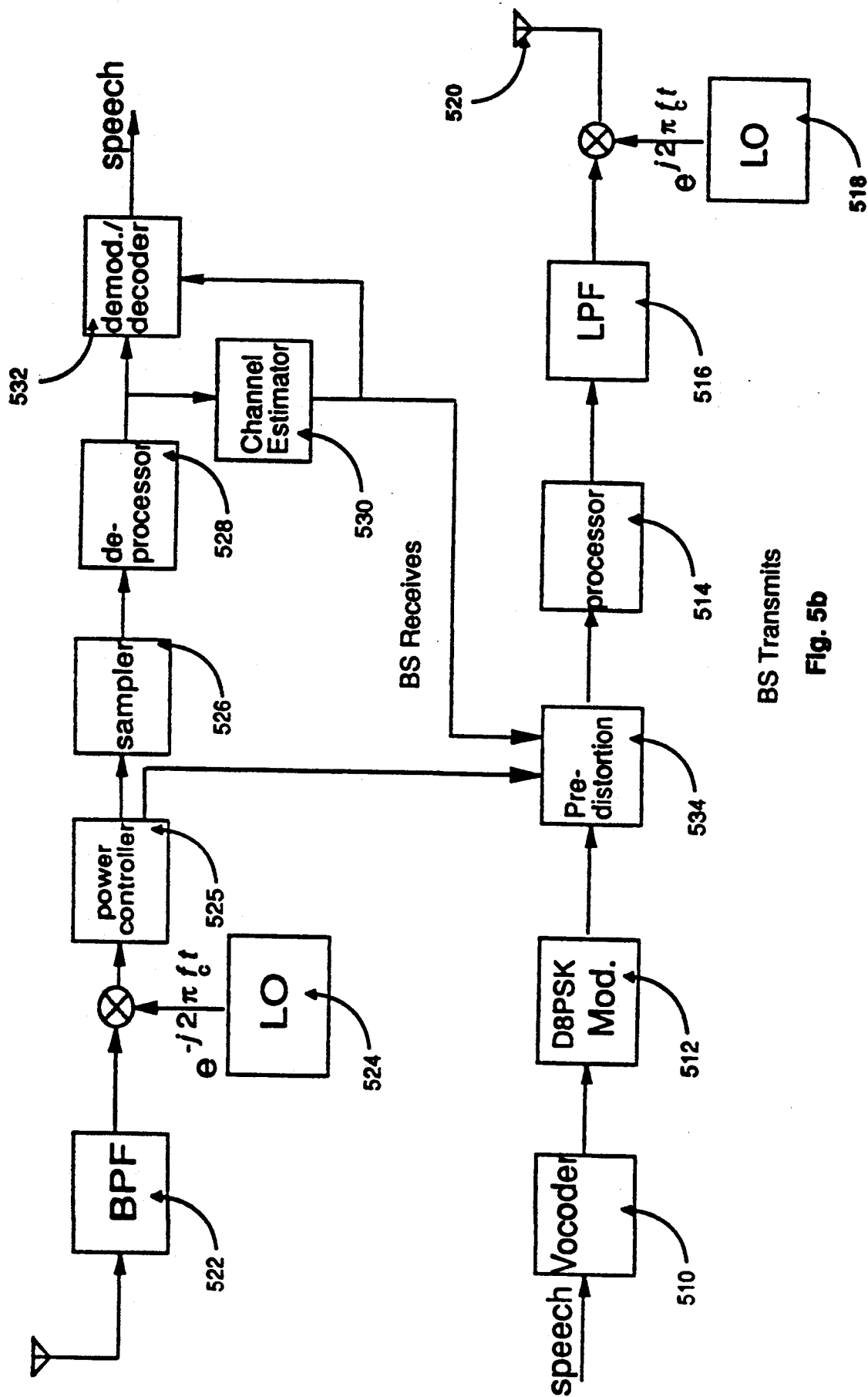
FIG. 5b is a block diagram showing the structure and function of an embodiment of the transmitter and receiver of a cellular base station in accordance with the invention.
Figure 5C:
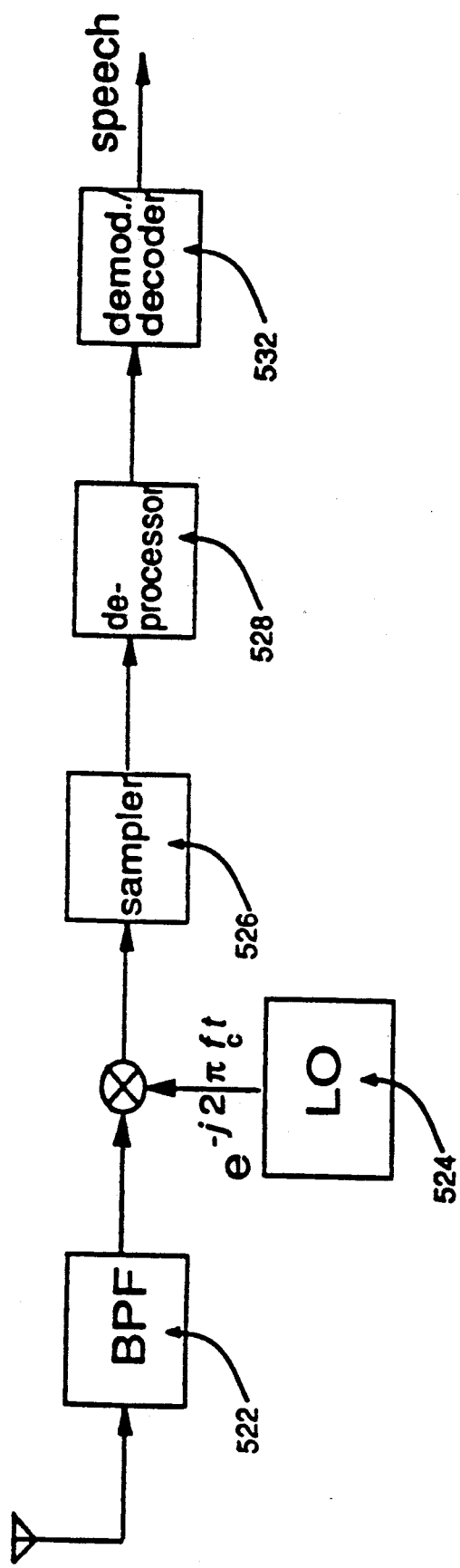
FIG. 5c is a block diagram showing the structure and function of an embodiment of the receiver of a cellular portable in accordance with the invention.

The transmitter/receiver block diagrams corresponding to the protocol in FIG. 4 are shown in FIGS. 5a, 5b and 5c. FIG. 5a corresponds to step 1 in the protocol described above. Speech is provided to a vocoder 510 where the speech is digitized and coded to create bits of information. The bits are provided to the modulator 512 which turns them into D8PSK symbols, with three bits per symbol. The D8PSK symbols are then processed in the processor 514 which is described in more detail in FIG. 6a. The output from the processor is then filtered in low pass filter 516, upconverted to RF frequencies using local oscillator 518 and transmitted by antenna 520. Figure 5b corresponds to steps 2 and 3.

In FIG. 5b, the received signal at the base station is filtered in a bandpass filter 522, and down converted by mixing with the output of a local oscillator 524. The average power of the downcoverted signal is monitored by a power controller 525 that adjusts the average power to the specifications required by the sampler 526. The adjusted downconverted bits are then sampled in sampler 526 to produce bits of information. The bits are then processed in the deprocessor 528, described in more detail in FIG. 6b. An estimate of the phase differential of the received signal is taken in the channel estimator 530, as described in more detail in relation to FIG. 7a and 7b below, and the estimated phase differential is supplied to a decoder-demodulator 532 to correct the received bits. The estimated phase differential is also supplied to a pre-distorter 534 in the transmitter. At the transmitter in the Base Station, the same blocks are incorporated as in the portable transmitter except that a pre-distorter is used to alter the phase of the D8PSK symbols to make the channel appear Gaussian (ideal) as opposed to a fading channel. The predistorter 534 receives a signal corresponding to the estimated phase differential of the channel. On the (believed reasonable) assumption that the channel is reciprocal, the signal being transmitted is predistorted with the estimated phase differential so that the received signal at the portable with which the BS is communicating will be corrected for any phase distortion over the channel. The advantage of rendering the channel Gaussian is a large saving in the power required to achieve an acceptable BER. The initial power control 525 also sends a signal to the pre-distorter 534 to adjust the transmitted power to an appropriate signal level for the sampler 526 in the portable's receiver depending on the average power of the received signal. Thus if the average power is too low, the transmitted power is increased and if the average power is too high, the transmitted power is decreased. The power controller 525 may also be used in frequency hopping to monitor the average power of the received frequency and determine when frequency hopping need take place.

FIG. 5c corresponds to step 4, and shows the receiver of the portable, which is the same as the receiver in the BS except it does not include an estimator or a power controller. These are not required in the portable on the assumption that the BS will carry out the phase estimation and the power control. However, if desired, the portable may include these functions.

Figure 6C:
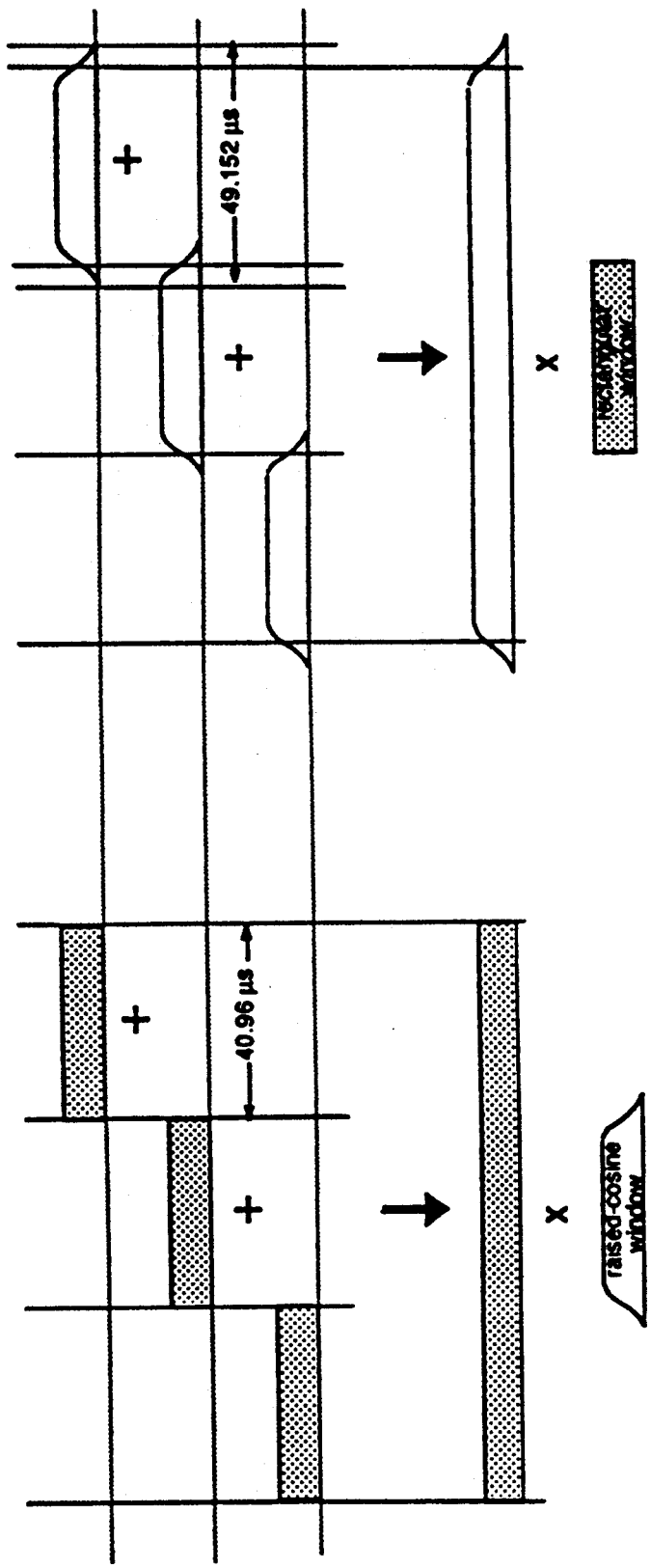
FIG. 6c is a schematic further illustrating the operation of the processor and deprocessor shown in FIGS. 6a and 6b.

FIGS. 6a, 6b and 6c illustrate the function and structure of the processor and the deprocessor respectively in the transmitter and receiver. Software for modelling the function of the processor in a general purpose computer has been filed with the Patent and Trademark Office as frames 3 to 26 of the microfiche appendix and for modelling the function of the deprocessor has been filed with the Patent and Trademark Office as frames 27-41 of the microfiche appendix.

FIG. 6a shows that the processor is a DSP implementation of an RC pulse shaping filter with a 20% roll-off, followed by an inverse Fourier transform. The processor first inverse Fourier transforms the 4096 D8PSK modulated symbols output from the modulator. The transformed symbols are then triplicated as a group so that the total number of samples is tripled, with three consecutive groups each consisting of the 4096 transformed symbols. The triplication of the signal is illustrated in FIG. 6c, where the symbols are shown as first delayed and added together. Next, as shown in FIGS. 6a and 6c, the three groups are windowed by a Raised Cosine window with a roll-off of 0.2 centered in the middle of the three groups. In other words, the processor takes D8PSK symbols in, pulse shapes them and inverse Fourier transforms them. On the other hand, the deprocessor undoes what the processor did, i.e. it removes the pulse shaping, then Fourier transforms the received signal to obtain the original D8PSK symbols. The first two blocks in FIG. 6b are similar to the second two blocks in FIG. 6a except for two differences. The two differences are as follows. In the first block of the deprocessor, the repeated groups of symbols are partially overlapped as shown in FIG. 6c on the right hand side. In the second block, a rectangular window is used instead of the Raised Cosine. In the preferred implementation, the blocks are repeated three times but other numbers of repetition may be used.

FIGS. 6a, 6b and 6c show that the DSP blocks used in the processor are identical to the ones used in the deprocessor, except for a small change in the two transforms and a small change in the shapes of the two windows. Thus the same hardware can be used by both the processor and the deprocessor.

Figure 7A:
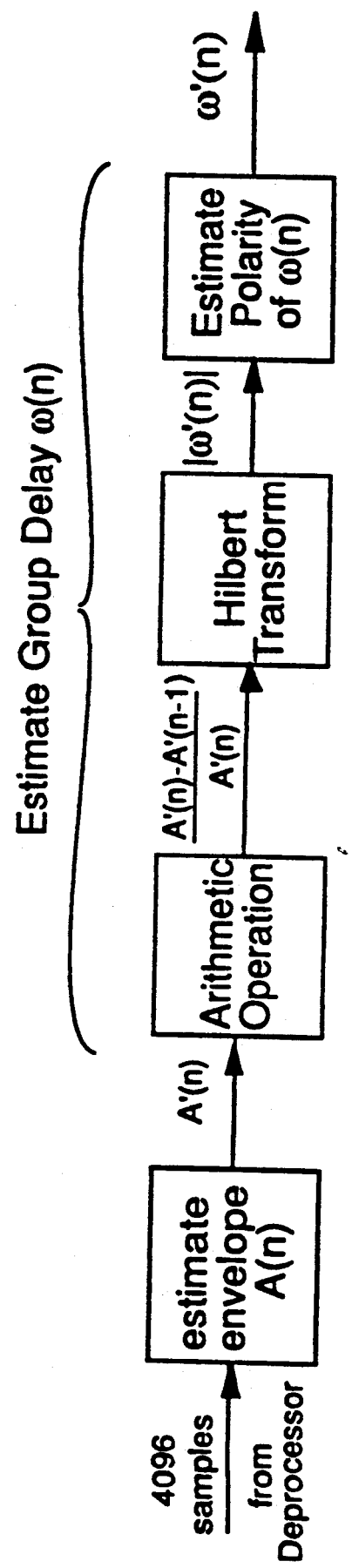
FIG. 7a is a schematic showing the structure and function of the channel estimator in FIG. 5b.
Figure 7B:
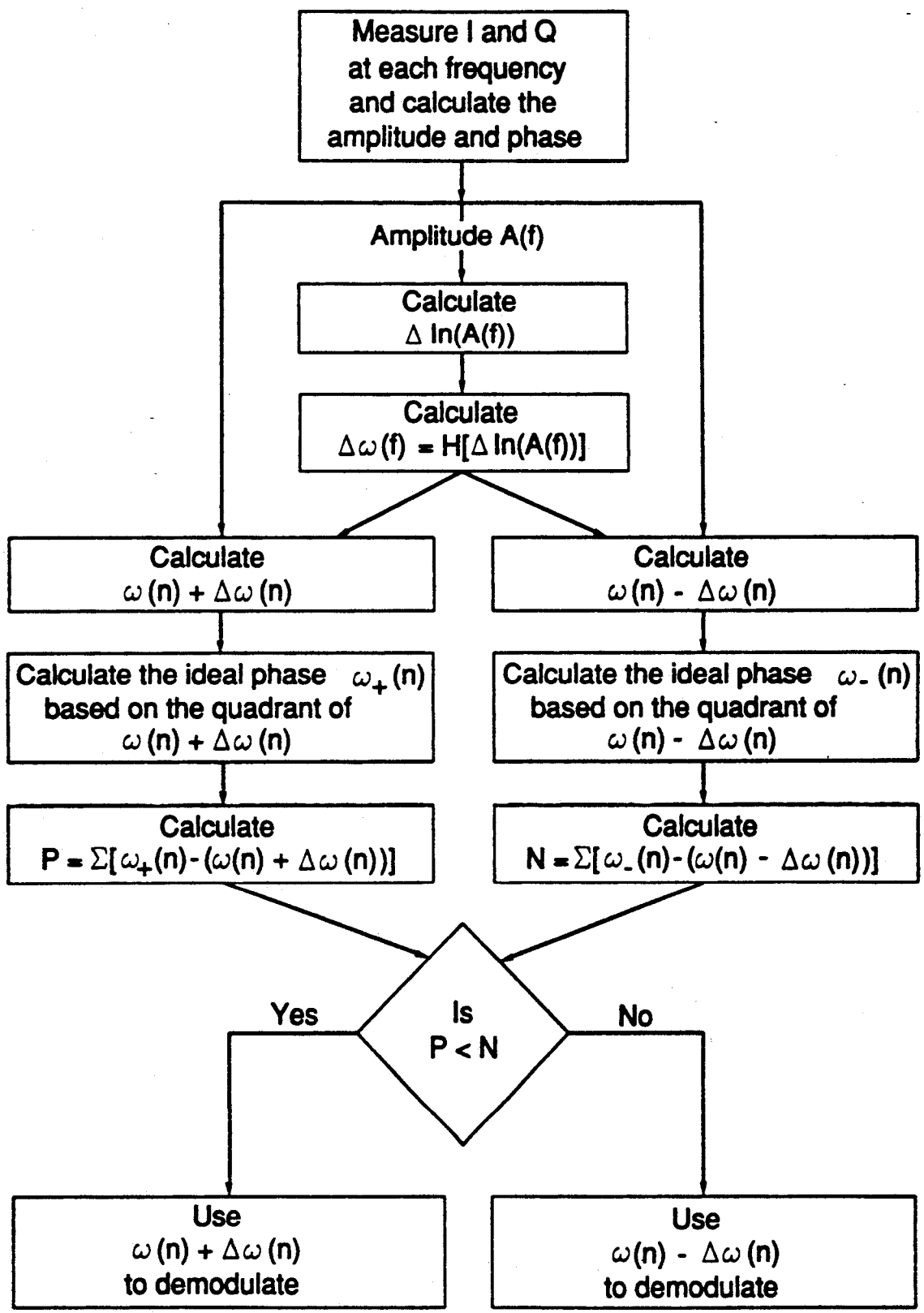

FIG. 7a shows a block diagram of an example of a preferred channel estimator, and FIG. 7b is a flow chart showing the operation of the phase estimator. Each of the steps is carried out in a computing means that may be a special purpose computer or a general purpose computer programmed to carry out the digital signal processing described here, as for example with the software that has been filed with the Patent and Trademark Office as frames 42-55 of the microfiche appendix. Other methods of estimating the channel may be used that obtain an estimate of the channel group delay or phase differential of the transmitted symbols. However, a preferred implementation is described here.

The first block in FIG. 7a estimates the envelope A(n) for n=1, ..., 4096 of the (frequency domain) samples transmitted over the fading channel as output from the deprocessor. The estimate A'(n) is the square-root of the sum of the squares of the quadrature (Q) and inphase (I) samples output from the deprocessor which may be filtered in accordance with known techniques before or after estimation of the envelope. The second block performs the operation:

$\Delta \ln(A'(t)) = (A'(t)) = (A'(n) - A'(n-1))/A'(n)$, for n=2, ..., 4096, where A'(n) is the estimate of A(n). The third block performs a Hilbert transform operation $H[\Delta\ln(A'(t))]$ on the result of the second block. $H[\Delta\ln(A'(t))]$ is an estimate of $|\Delta\omega(n)|$ for n=2, ..., 4096, where $\Delta\omega(n)$ is the phase differential of the transmitted signal ($\omega$ is the phase of the signal). The Hilbert transform is preferably carried out by taking the discrete fast Fourier transform of the data record, multiplying the positive frequency spectrum of the transform by $-i$ (square root $-1$), and the negative frequency spectrum of the transform by i, and taking the inverse discrete fast Fourier transform. The result is a set of symbols representing an estimate of the phase differential of the received signal, as determined from its sampled amplitude envelope.

Instead of a Hilbert transform, a different estimation may be made to estimate the phase differential. In this case, firstly, after the electromagnetic signal has been sampled, a series of data frames of a number of consecutive amplitude samples (A(t)) of the electromagnetic signal are constructed. These data frames are then segmented into segments $[t_1, t_2]$, where the amplitude of the electromagnetic signal is at least a predetermined number of dB less than its running mean, for example, 10dB. The following calculation is then applied to these segments of the amplitude samples:

$$\Delta\omega(t) \approx 1/t_0 \frac{-1}{1 + (t'/t_0)^2}$$

where $t' = t - t_{min}$, $t_{min}$ is the time in $[t_1, t_2]$ when A(t) reaches its minimum, t is the time from the beginning of the segment, and $t_0$ is the time from the instant the amplitude of the electromagnetic signal reaches its minimum during the segment until the amplitude reaches double its minimum during the segment. In other words, the phase differential may be calculated from $$\Delta\omega(t) \approx -t_0/(t_0^2 + t'^2).$$

The polarity of $\Delta\omega(n)$ is extracted using the last block shown in FIG. 7a. The estimate so calculated does not provide the sign of the differential. This may be determined by known techniques, for example by adding the phase differential to and subtracting the phase differential from the received phase ($\tan^{-1}$ (Q/I)) and taking the sign to be positive if the addition results in the smaller Euclidean distance to the expected value and negative if the subtraction results in the smaller Euclidean distance to the expected value.

Equivalently, for each sample n, the ideal phase closest to $\omega(n) + \Delta\omega(n)$ is determined and labelled $\omega_+(n)$, and the ideal phase closest to $\omega(n) - \Delta\omega(n)$ is determined and labelled $\omega_-(n)$. The two sums $P = \Sigma|\omega_+(n) - \{\omega(n) + \Delta\omega(n)\}|$ and $N = \Sigma|\omega_-\{\omega(n) - \Delta\omega(n)\}|$ are calculated. If P<N, then $\omega(n) + \Delta\omega(n)$ is used to correct the signal, and if not then $\omega(n) - \Delta\omega(n)$ is used to correct the signal.

For simplicity of the estimator, the determination of the sign need only be carried out for phase differentials greater than a predetermined threshold. This will be in the vicinity of a fade and may be accomplished by segmenting the data record into a segment in which the phase differential is larger than a selected threshold and setting the remainder of the data record to zero. This computation may be carried out with a simple discrimination circuit or equivalent computing means in the estimator.

The bias $\delta\omega$ of the channel group delay is estimated by averaging $\Delta\omega'(n)$ over n for n=1, ..., 4096 where $\Delta\omega'(n)$ is the measured value of $\Delta\omega(n)$. The estimates A'(n) and $\Delta\omega'(n)$ are used directly in the predistortion filter in FIG. 5b, while the estimates $\Delta\omega(n)$ and $\delta\omega$ of the unbiased channel group delay and of the bias of the channel group delay respectively are used in the demodulator.

The complexity of the processor-deprocessor-channel estimator is displayed in Table II. Complexity is measured in Mega Instructions Per Second (MIPS) where one instruction is defined as one complex addition, one complex multiplication and a storage of one complex number. It does not include overhead.

The complexity of the processor-deprocessor-channel estimator in the BS is computed from the complexity of the Inverse Fast Fourier Transform (IFFT)/Fast Fourier Transform (FFT)/Hilbert Transform. The complexity is $4096 \times 12 \times 4 \times 21/13.104$ ms for the BS. For the portable, it is computed from the complexity of the FFT/IFFT per vc: $(32 \times 5 + 64 + 128 + 256 + 512 + 1024 + 2048 + 4096)2/13.104$ ms for the portable with a 6.18 Kbps vocoder. Such a complexity assumes that the A/D converter operates at 100 MHz with 12 bit precision. As seen in Table II, the portable has smaller complexity due to the fact that the portable transmits/receives one vc in 13.104 ms and the BS transmits/receives up to $21 \times N$ vc in 13.104 ms.

Reducing Analog Complexity

Comparing FIG. 1 (prior art) and FIG. 5, it will be seen that several conventional blocks are not used in the present invention, namely the interleaver-deinterleaver, the Power Amplifier (PA), both the clock and the carrier recovery, both the AGC with its associated Passband hard limiter, as well as the equalizer.

From the BS point of view, the interleaver-deinterleaver is not required since the signal is predistorted before transmission forcing the received samples to be independent. From the portable point of view, the interleaver-deinterleaver is not required as a separate entity from the vocoder due to the fact that the channel is highly frequency selective, hence the interleaving/deinterleaving can be applied implicitly in the vocoder over one vc, without a need for a separate time domain interleaver/deinterleaver. This eliminates excess speech delays associated with interleaving/deinterleaving between frames.

The PA is not required since the cells can have, as shown later, a radius of up to at least 250 m outdoors and 30 m indoors, if the transmitted power is up to 6 dBm. Such a power can be generated by the Local Oscillator (LO) without a need for a PA. It is important to avoid using a PA since DOFDM generates a time domain signal with non constant envelope. A power efficient class C PA cannot be used without distorting the signal. A class A PA can be used at the expense of power efficiency.

A clock recovery device is not required since a sampling error in the time domain is equivalent to a phase shift in the frequency domain. The phase shift is a linear function of frequency. It contributes to the bias in the channel group delay. Such a bias can be easily estimated and removed as mentioned previously by averaging $\omega'(n)$ over n in the frequency domain. Such an estimate is accurate as long as the sampling error is less than 0.2 $\mu$s or equivalently less than 20 samples (since in this case, the corresponding phase shift is less than $\pi$), and as long as the number of points in one vc is large enough as it is here.

A carrier recovery device is not required since a carrier offset in the time domain is equivalent to a sampling error in the frequency domain. For the chosen RC pulse, a sampling error of up to 10% of the duration of one pulse is acceptable.

This implies that a frequency offset of up to 2.414 KHz is acceptable regardless whether it is due to carrier offset as low as 1 part in a million, i.e. as low as 1 KHz per 1 GHz. When a carrier frequency higher than 2.414 GHz is required, one can decrease in FIG. 2 the number of points per 100 MHz or one can use an RC pulse with a rolloff larger than 20%.

Neither an AGC nor a Passband hard-limiter are required since the level of the received power may be controlled constantly. This is achieved as follows: The portable transmits a frame. The BS receives the frame and predistorts a frame intended for transmission accordingly, assuming that the channel is reciprocal and stationary over 520 $\mu$s. This includes controlling the transmitted power according to the received power. The BS transmits the predistorted frame and simultaneously orders the portable to control its power. The order is conveyed using the control symbol in the vc slot (See table I). The degree of power control may be determined using the power controller 525, and the instruction for the inclusion of a power control symbol in the vc may be sent from the power controller 525 to the predistorter 534.

One advantage of wideband modulation over narrowband modulation is that the wideband signal does not experience short term fading the same way the narrowband one does. The wideband signal is mainly affected by shadowing and other long term effects which vary slowly and are easily monitored from one frame to the other as long as the same vc slot is used by the portable to transmit and receive (i.e. as long as TDD is employed).

Finally, conventional equalization, whether it is linear or nonlinear, is not required simply because there is little or no ISI. Also, from the portable point of view, each received vc is predistorted by the BS. Hence, the channel can be modeled approximately as an ideal memoryless Additive White Noise Gaussian (AWGN) channel, assuming channel reciprocity and stationarity over 520 $\mu$s. From the BS point of view, since the received signal is not predistorted by the portable prior transmission, the channel estimator is used to reduce the effect of the channel group delay.

Smaller cells

As mentioned previously, the LO generates a 6 dBm average power, hence the signal power transmitted by the BS over one vc slot is (6 dBm $-10\log_{10}N$ dB) while the signal power transmitted by the portable over one vc slot is 0 dBm. Also, since the noise power over a 100 MHz band is $-94$ dBm, it is ($-94$ dBm $-10\log_{10}N$ dB) over one vc. A typical noise figure at the receiver is 7 dB. The penalty for not using a matched filter in the receiver is 1 dB. Combining together the above figures provides the portable with an (92 dB $-$ path loss in dB) received signal to noise ratio (SNR), while it provides the BS with an (86 dB $+10\log_{10}N$ dB $-$ path loss in dB) received SNR.

For a path loss of 75 dB, the radius of the urban cell can be 250 m while it can be 30 m for the indoor cell. Such a path loss provides the portable with a 17 dB received SNR, while it provides the BS with an (11 dB $+$ $10\log_{10}N$ dB) received SNR. From the portable point of view, the channel can be modeled approximately as an ideal AWGN channel, hence the 17 dB received SNR results in a $2\times10^{-3}$ BER. On the other hand, the channel can be pessimistically modeled as a Rayleigh fading channel from the BS point of view. The corresponding BER are displayed in Table III which shows that the achieved BER is $\leq 4\times10^{-3}$. A BER $\leq 10^{-2}$ is acceptable for voice.

Cell Pattern Reuse

From Table I, the number of Full Duplex voice channels (FDvc) that can be transmitted/received per frame is 136 over 100 MHz, for a 6.18 Kbps vocoder. If the bandwidth is halved to 50 MHz, the number of FDvc per frame is reduced to 68, the noise floor is reduced by 3 dB and the number of full duplex frames that a BS can transmit/receive is doubled to 42, leaving the frame duration, the number of frames per 13.104 ms and the processor/deprocessor complexity unchanged.

Reducing the available bandwidth directly affects the cell pattern reuse. This can be explained as follows, assuming that we are required to offer a minimum of 136 FDvc per cell, that the vocoder rate is 6.18 Kbps and that the cell radius is fixed at 250 m outdoors and 30 m indoors. For a 100 MHz band, we assign one frame per cell and offer 136 FDvc per cell. In this case, the cell pattern reuse consists of 126 cells as shown in FIG. 8a which displays a seven layer structure. For a 50 MHz band, we assign two frames per cell and offer 136 FDvc per cell, hence reducing our cell pattern reuse to a 63 cell pattern as shown in FIG. 8b which displays a five layer structure. If the available bandwidth is as low as 5.86 MHz, we have 8 vc per frame. Hence we have to assign 18 frames per cell in order to offer the minimum required number of FDvc per cell. This reduces the cell pattern reuse to as low as a 7 cell pattern as shown in FIG. 8c which displays a two layer structure.

In FIGS. 8a, b and c, a shaded area is shown around the center of the pattern, indicating 19, 38 and 126 full duplex frames that the central BS can transmit/receive respectively. Tables IVa, b and c show the number of cell layers in each cell pattern reuse, the coverage area in Km$^2$ of the pattern reuse for both the indoor and the urban environments, as well as the carrier to interference ratio (CIR) in dB, for the 100 MHz, 50 MHz and 5.96 MHz bands, respectively. In all cases, the CIR is large enough to sustain a toll quality speech.

Transmission/Reception Protocol

Since the number of FDvc a portable can transmit/receive is one, while the number of FDvc a BS can transmit/receive is much larger as shown in Table V for each of the three vocoder rates, we have chosen the following transmission/reception protocol:
1. The portable transmits a frame over a vc.
2. Seven adjacent BS receive the frame from the portable.
3. One BS transmits to the portable, depending for example on the strength of the received signal by each of the BS.

The control of this protocol may use any of several known techniques. For example, the commonly used technique is to have the portable monitor the channel and determine which of several base stations it is closest to. It can then order the nearest BS to communicate with it. Another technique is to use a master control which receives information about the strength of the signal on the channel used by the portable and controls the BS accordingly. Such techniques in themselves are known and do not form part of the invention.

Such a protocol has several advantages. For instance, the location of the portable can be determined with high accuracy based on the received vc at the seven adjacent BS. Locating the portable can assist in the BS hand-off. A BS hand-off and a portable hand-off do not necessarily occur simultaneously, contrary to other prior art systems. In the present invention, when a portable roams from one cell X to an adjacent cell Y, a new vc is not required immediately. What is required is a BS hand-off, meaning that BS Y (associated with cell Y) must initiate transmission to the portable over the same vc, while the BS X (associated with cell X) must terminate its transmission to the portable.

A BS hand-off occurs without the knowledge of the portable and can occur several times before a portable hand-off is required. A portable hand-off is required only when the CIR is below a certain level. In this case, the Mobile Telephone Switching Office (not shown) calls for a portable hand-off in accordance with known procedures. Reducing the portable hand-off rate reduces the probability of dropped calls. This is because a dropped call occurs either because the portable hand-off is not successful or because there are no available channels in cell Y.

The present invention allows the use of post-detection diversity at the BS, and the use of dynamic channel allocation (DCA).

Dynamic Channel Allocation

DCA is made possible by each BS having capability to transmit/receive more than the number of FDvc allocated to its cell, namely seven times the number of FDvc for a 5.86 MHz band and up to twenty-one times the number of FDvc for a 100 MHz as well as a 50 MHz band. The DCA protocol simply consists of borrowing as many FDvc as needed from the adjacent cells, up to a certain limit. The limit for the case when we employ a 6.18 Kbps vocoder, a 5.86 MHz band and 18 frames per cell is obtained as follows. The cell reuse pattern consists of 7 cells. Each cell is preassigned 144 FDvc. Assuming that at peak hours, 75 FDvc are used on the average and 5 FDvc are reserved at all times, then we are left with 64 idle channels which represent the limit on the number of FDvc one can borrow from the cell.

One should distinguish between the limit on the channels borrowed and the limit on the nonpreassigned channels a BS can use. For instance, if a call originates in cell X and the portable roams into an adjacent cell Y where no preassigned cells are available, BS Y does not need to borrow immediately a new channel from an adjacent cell. It can use the original channel as long as the level of CIR is acceptable. If on the other hand, a portable wants to initiate a call in cell Y where all preassigned channels are used, BS Y can borrow a channel from an adjacent cell up to a limit of 64 channels per cell.

The main advantage of DCA over Fixed Channel Allocation (FCA) is the increase in traffic handling capability For FCA, a 7 cell pattern each with a preassigned 144 Fdvc can carry a total traffic of 880.81 Erlang at 0.01 Blocking Probability (BP). For DCA, a 7 cell pattern consists of 6 cells each with 80 FDvc that can carry a total traffic of 392.17 Erlang, combined with one cell with 528 FDvc that can carry 501.74 Erlang. The total traffic is therefore 893.91 Erlang. This increase appears to be marginal (1.5%). However, if 501.74 Erlang are actually offered to one cell in the FCA system (with 14 FDvc/cell), while the six other cells carry 392.17/6=65.36 Erlang per cell, the BP at that busy cell 0.714 while it is negligible at the six other cells. The total blocked traffic (i.e. lost traffic) in the FCA system is then equal to $(6 \times 65.36 \times 0.0 + 1 \times 0.714 \times 501.24)$ 358.24 Erlang. This represents a 0.4 average BP. If the DCA is allowed such a loss, its traffic handling capacity would increase to 1768.04 Erlang which represents a 100% increase in traffic handling capacity over the FCA system, or equivalently a 160% increase in the number of available FDvc. The DCA system thus represents a marked improvement over the FCA system.

Voice Activation

Voice activation is controlled by the BS according to techniques known in the art. At any instant during a conversation between a BS and a portable, there are four possibilities:
1. BS talks while the portable listens.
2. BS listens while the portable talks.
3. BS and portable talk simultaneously.
4. BS and portable listen simultaneously.

The BS controls the voice activation procedure by allocating in cases 1, 3 and 4 three slots (frames 1.1, 1.2 and 1.3) to the BS and one slot the portable (frame 1) every four slots as shown in FIG. 9a. Likewise up to 21 portables may communicate with the base station in like fashion.

Figure 9B:
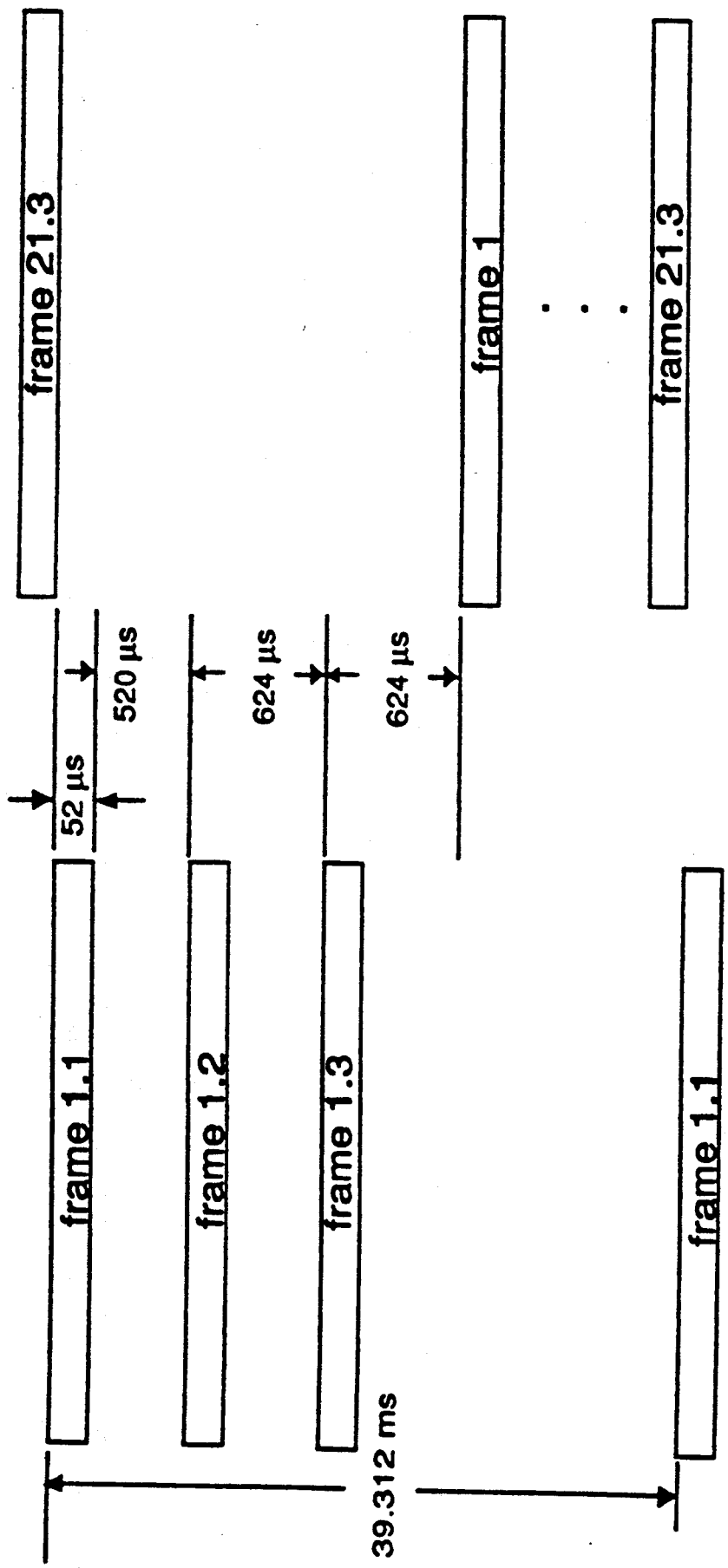

In case 2, on receiving a signal from the portable, the BS allocates three slots (frames 1.1, 1.2 and 1.3) to the portable and one slot (frame 1) to the BS every four slots as shown in FIG. 9b. Likewise, up to 21 other portables may communicate with the base station in like fashion. Consequently, instead of transmitting two full duplex voice frames over four slots as in FIG. 4, voice activation allows us to transmit three full duplex voice frames over four slots. Hence, voice activation provides a 50% increase in the number of available FDvc at the expense of increasing DSP complexity.

Capacity

The capacity of Code Division Multiple Access (CDMA) may be defined as the number of half duplex voice channels (HDvc) effectively available over a 1.25 MHz band per cell. Based on such a definition, Table IV displays the capacity of analog FM and of the present system with a 6.18 Kbps vocoder, 5.86 MHz band, 1 frame per cell and DCA. As shown in Table IV, the capacity of analog FM is 6 HDvc/1.25 MHz/cell while for the present system it is 150 HDvc/1.25 MHz/cell.

The 6.25 MHz band consists of 5.86 MHz plus two tail slots. When voice activation is used, the capacity of the present system is increased by 1.5 times to 225 HDvc/1.25 MHz/cell, a 38 fold increase over analog FM.

Local Area Networks

The invention may also be applied to produce a 48 Mbps wireless LAN, which also satisfies the technical requirements for spread spectrum.

For wireless LAN, wideband differential orthogonal frequency division multiplexing is again employed. The LAN will incorporate a plurality of transceivers, all more or less equal in terms of processing complexity, and possibly with identical components except for addresses.

Figure 10:
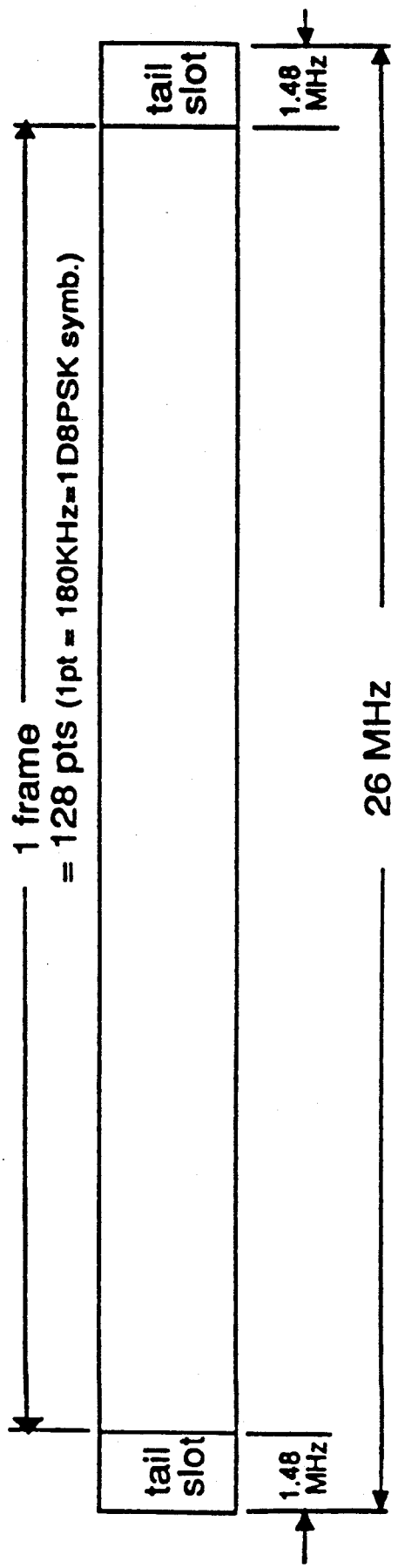
FIG. 10 is a schematic showing the use of the available frequencies according to another aspect of the invention for use with local area network applications.

To implement wideband modulation for a LAN, a 26 MHz band is divided into 128 points, as shown in FIG. 10, plus two tail slots of 1.48 MHz each within the 26 MHz band. Adjacent points are separated by 180 KHz and each point, as with the application described above for a portable-base station, represents a D8PSK symbol. The transmitter components will be the same as shown in FIG. 5b, with suitable modifications as described in the following, and will include an encoder. The output bits from the encoder are mapped onto the D8PSK symbols.

Figure 11:
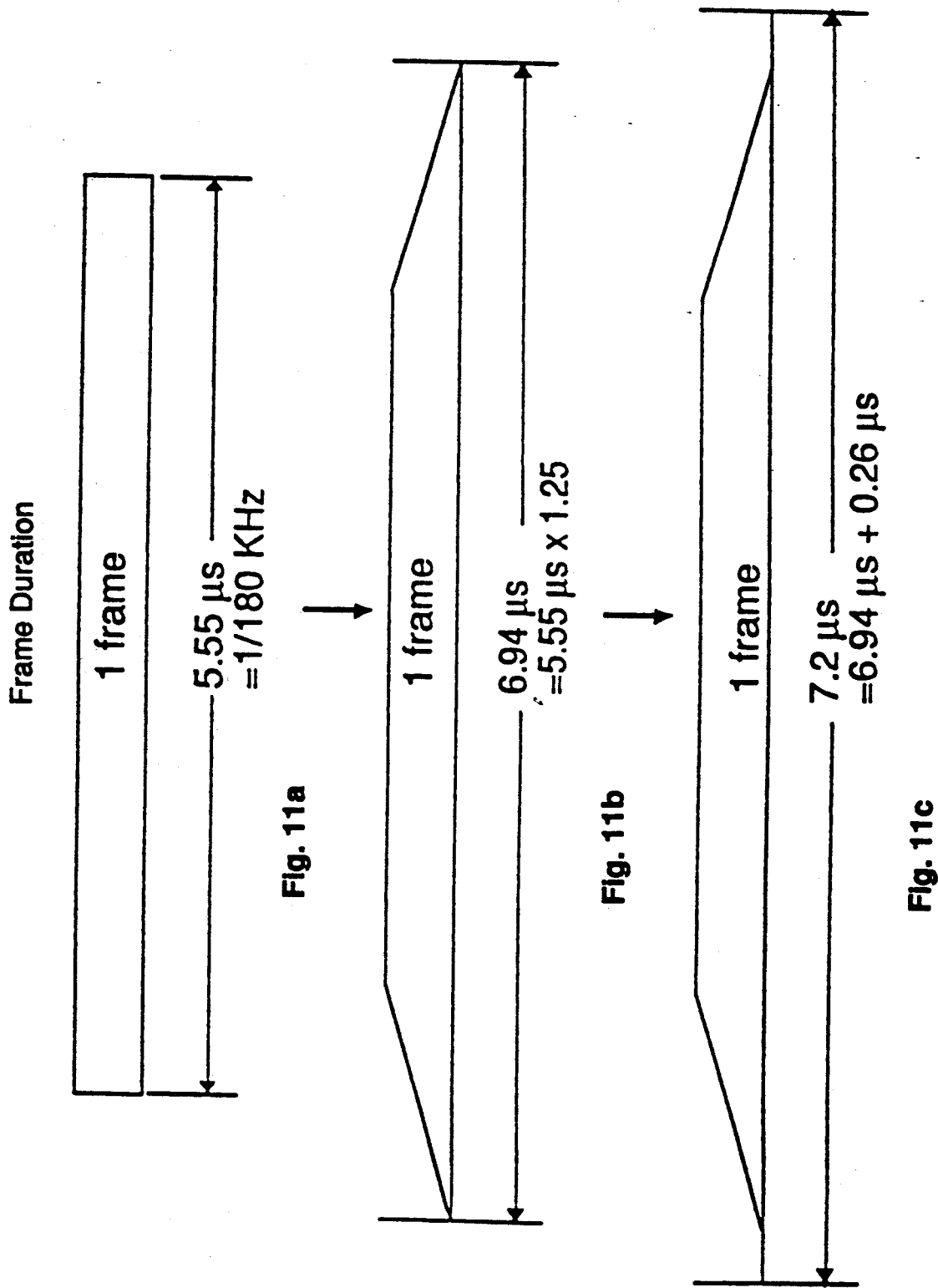

The frame duration for the symbols is illustrated in FIG. 11. A rectangular time domain window corresponding to a RC frequency domain pulse has a 5.55 μs duration, and includes a 25% roll-off and excess frame duration of 0.26 μs, making a total 7.2 μs duration for the frame.

Figure 12:
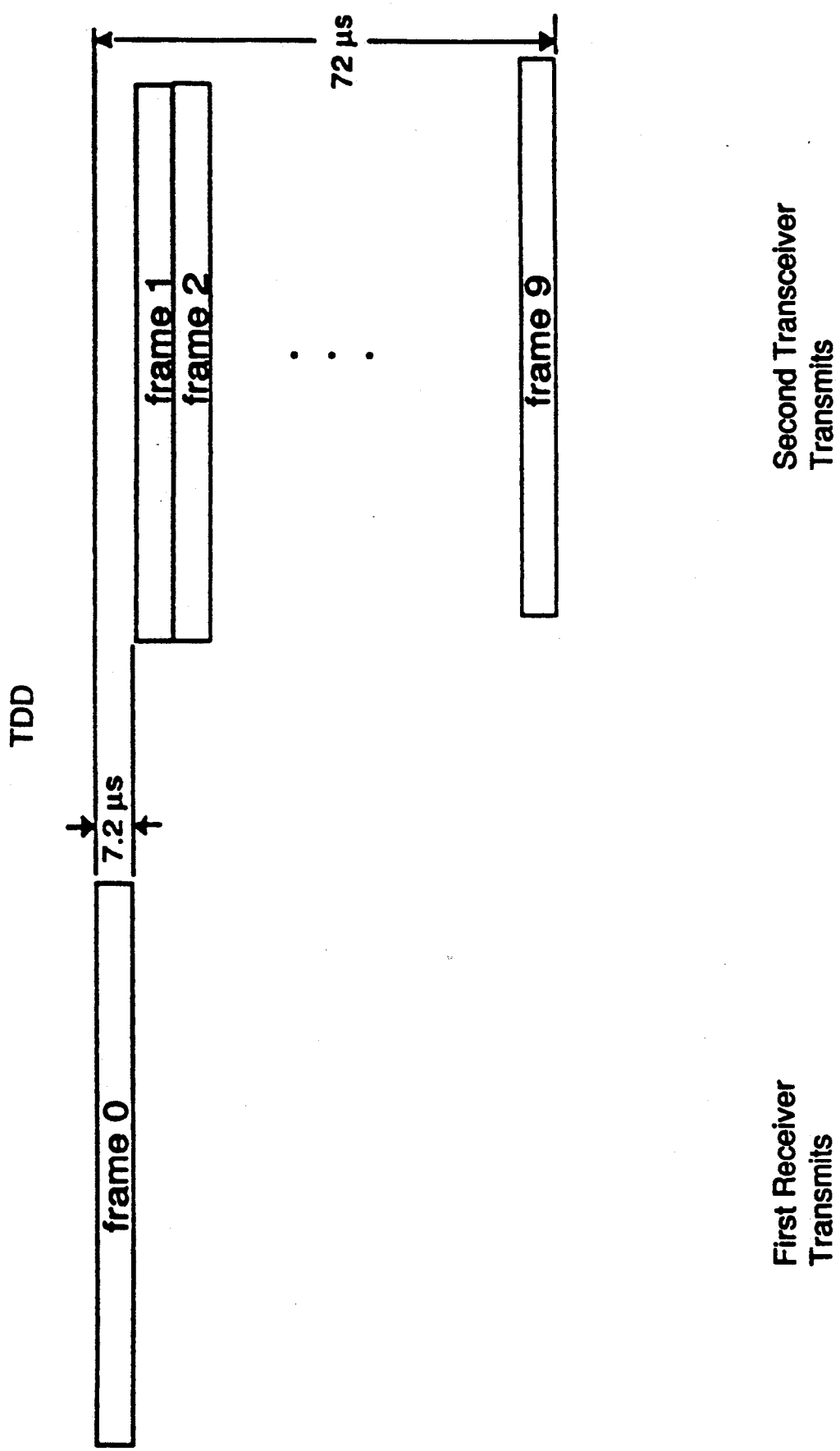
FIG. 12 is a schematic showing a preferred protocol for local area network communication.

For such a wireless local area network (LAN), in which the transceivers are equal, the Time Division Duplex protocol is as illustrated in FIG. 12 (assuming there are at least a pair of transceivers):

1. A first transceiver transmits a signal (frame 0) over the entire frame.
2. A second transceiver receives the signal from the first transceiver and processes (analyzes) it.
3. Based on the received signal, the second transceiver predistorts and transmits nine frames (frames 1-9) to the first transceiver immediately.

Each transceiver has transmitter components similar to those illustrated in FIG. 5b, with suitable modifications to the internal structure to allow the use of the particular frequency band and frame duration employed.

Figure 13A:
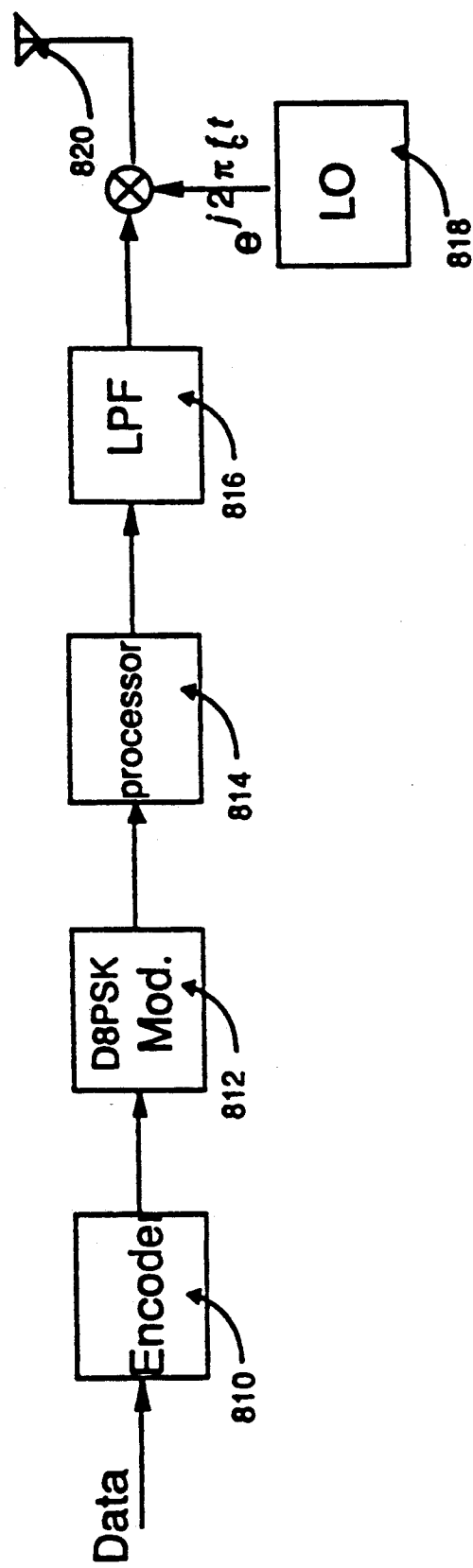
FIG. 13a is a block diagram showing the structure and function of an embodiment of the transmitter of a local area network transceiver according to the invention.
Figure 13B:
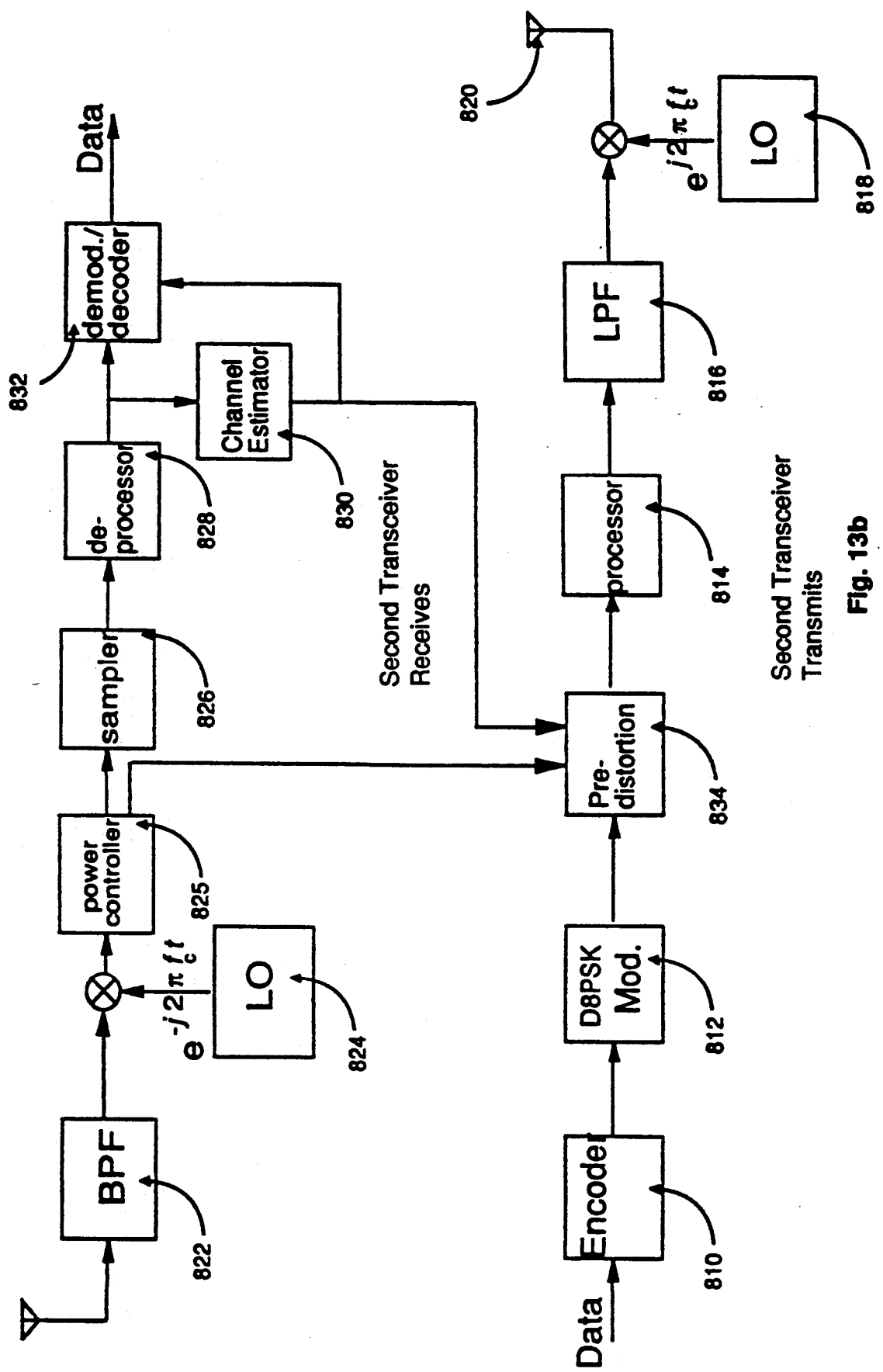
FIG. 13b is a block diagram showing the structure and function of an embodiment of a further local area network transceiver according to the invention.
Figure 13C:
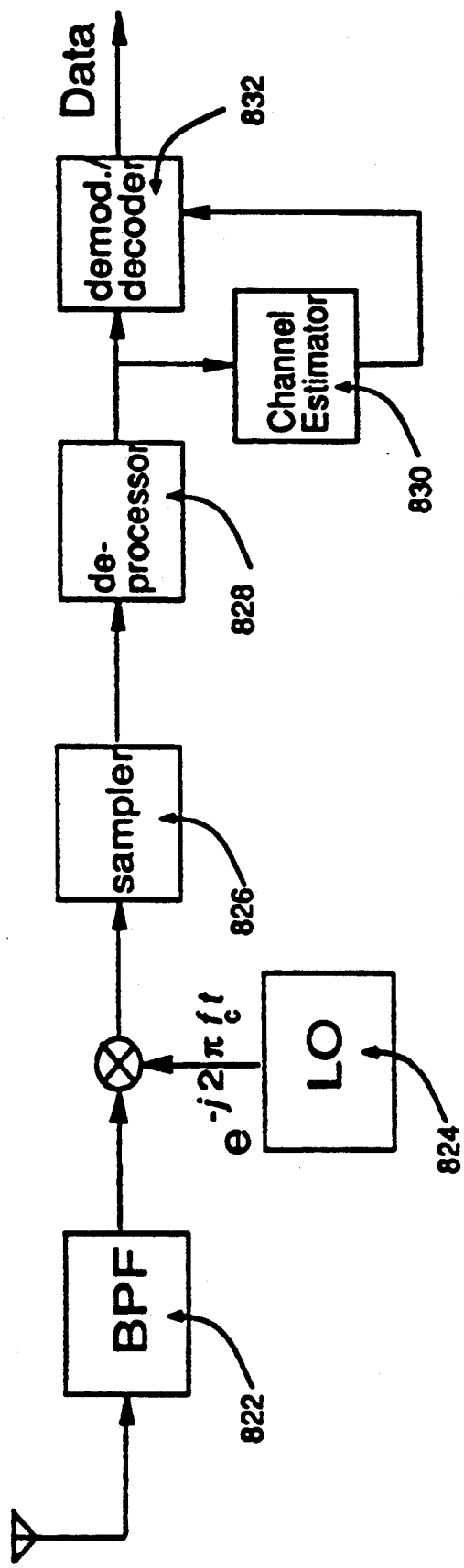
FIG. 13c is a block diagram showing the structure and function of an embodiment of the receiver of a local area network transceiver according to the invention.

The transmitter/receiver functional and structural block diagrams are shown in FIGS. 13a, 13b and 13c for the exchange of data. Data is provided to an encoder 810 where the data is digitized and coded to create bits of information. The bits are provided to the modulator 812 which turns them into D8PSK symbols, with three bits per symbol. The D8PSK symbols are then processed in the processor 814 which is described in more detail in FIG. 14a. The output from the processor is then filtered in low pass filter 816, upconverted to RF frequencies using local oscillator 818 and transmitted by antenna 820.

In FIG. 13b, the received signal at the base station is filtered in a bandpass filter 822, and down converted by mixing with the output of a local oscillator 824. The average power of the downcoverted signal is monitored by an initial power control 825 that adjusts the average power to the specifications required by the sampler 826. The adjusted downconverted signal is then sampled in sampler 826 to produce bits of information. The bits are then processed in the deprocessor 828, described in more detail in FIG. 14b. An estimate of the phase differential is taken in the channel estimator 830, as described in more detail in relation to FIG. 7 above, and the estimated phase differential is supplied to a decoder/demodulator 832 to correct the received bits. The estimated phase differential is also supplied to a pre-distorter 834 in the transmitter. At the transmitter in the Base Station, the same blocks are incorporated as in the portable transmitter except that a pre-distorter is used to alter the envelope and phase of the D8PSK symbols to make the channel appear Gaussian (ideal) as opposed to a fading channel. The initial power control 825 also sends a signal to the pre-distorter 834 to adjust the transmitted power to an appropriate signal level for the sampler 826 in the first transceiver. It will be appreciated that a pre-distorter will be included in the first transceiver's transmitter but that it will not be operable, except when the first transceiver is operating as a base station.

Figure 14C:
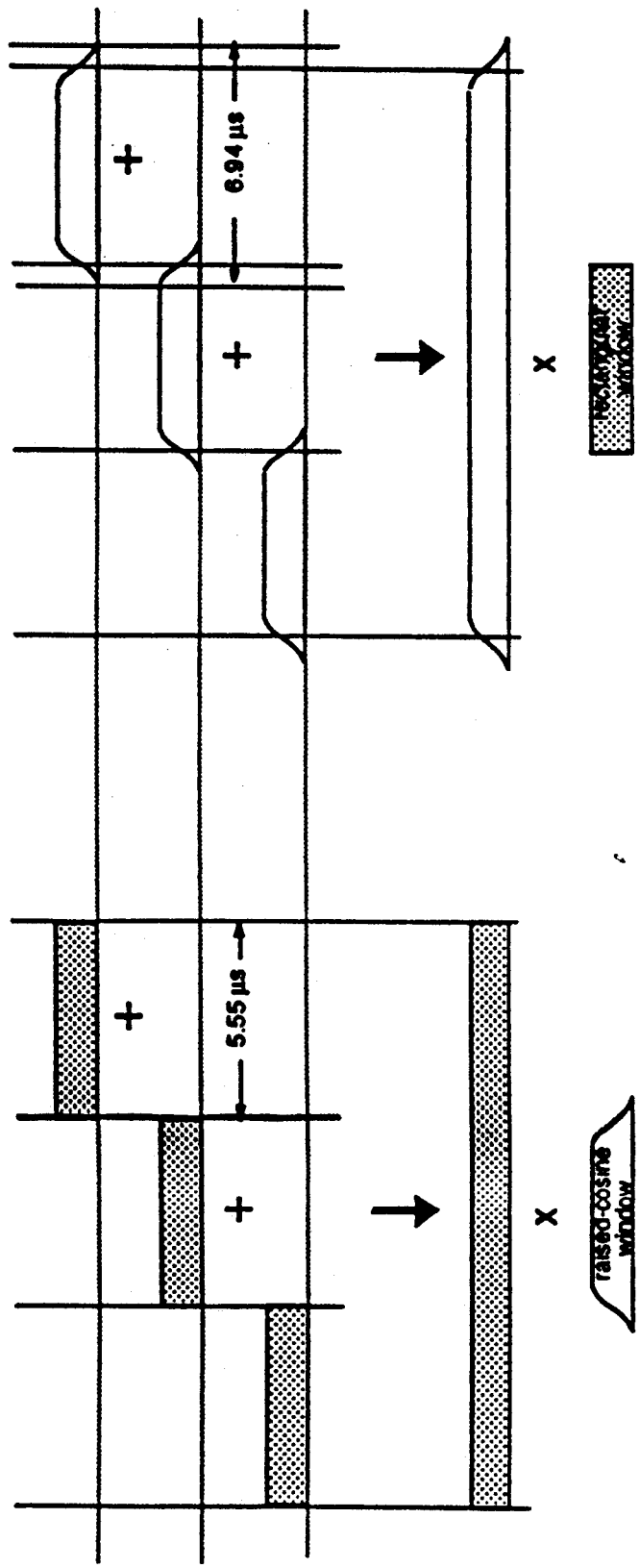
FIG. 14c is a schematic further illustrating the operation of the processor and deprocessor shown in FIGS. 14a and 14b.
Figure 15:
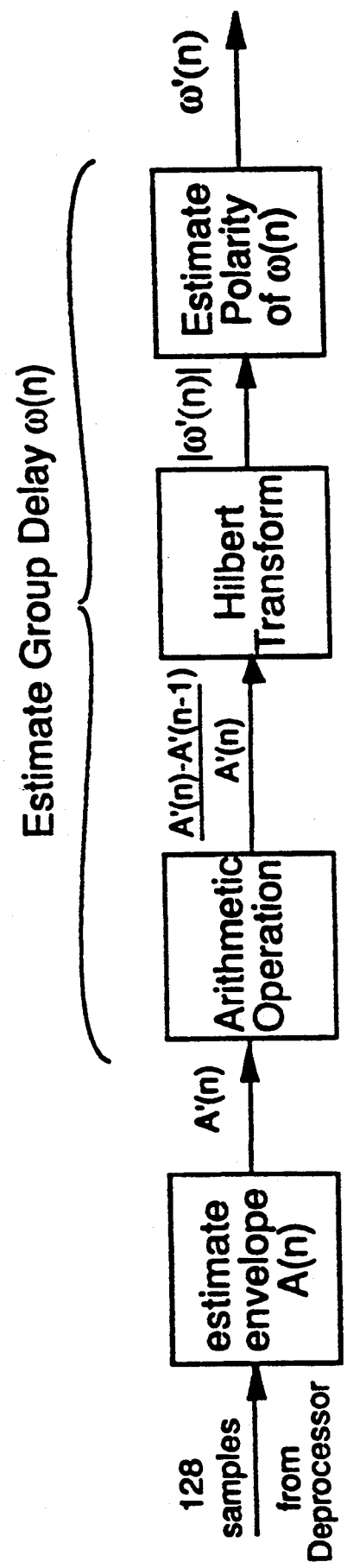
FIG. 15 is a schematic showing the structure and function of the channel estimator in FIG. 13b.

FIG. 13c shows the functional blocks of the receiver of the first transceiver, which is the same as the receiver in the second transceiver except it does not include an estimator. The processor is illustrated in FIG. 14a and 14c and the deprocessor in FIG. 14b and 14c. The processor first inverse Fourier transforms the 128 D8PSK symbols output from the modulator. The transformed symbols are then triplicated as a group so that the total number of samples is tripled (see the left side of FIG. 4c), with three consecutive groups each consisting of the 128 transformed symbols. Next, the three groups are windowed by a Raised Cosine window with a roll-off of 0.25 centered in the middle of the three groups. In other words, the processor takes D8PSK symbols in, pulse shapes them and inverse Fourier transforms them. On the other hand, the deprocessor undoes what the processor did, i.e. it removes the pulse shaping, then Fourier transforms the received signal to obtain the original D8PSK symbols. The first two blocks in FIG. 14b are similar to the second two blocks in FIG. 14a except for two differences as follows. In the first block shown in FIG. 14b, the repeated groups of symbols are partially overlapped, as shown in FIG. 14c. In the second block, a rectangular window is used instead of the Raised Cosine to produce 128 output samples corresponding to the 416 input samples.

The phase estimator is the same as that shown in FIG. 7, except that there are only 128 input samples, and the same description applies.

For both the LAN and cellular networks, the present system is designed to operate as a spread spectrum system preferably over such bands as are permitted, which at present are the 902—928 MHz band, 2.4—2.4835 GHz and 5.725—5.85 MHz. The carrier frequency in the local oscillator shown in FIGS. 5a, b and c will then be 915 MHz in the case of the 902—928 MHz band, and the frequencies used for modulation will be centered on this carrier frequency.

Alternative Embodiments

A person skilled in the art could make immaterial modifications to the invention described and claimed in this patent without departing from the essence of the invention.

For example, a system may consist of one or more central controllers (comparable to the Base Stations in the exemplary cellular system described) and some slave units (comparable to the portables). The slave unit executes the commands it receives from the central controller. The commands may be requesting the slave unit to transmit a receive acknowledge, a status code or information that the slave has access to. The command may also be to relay the command or the information to another slave unit.

We claim:

1. A transceiver including a transmitter for transmitting electromagnetic signals and a receiver for receiving electromagnetic signals having amplitude and phase differential characteristics, the transmitter comprising:
   an encoder for encoding information;
   a wideband frequency division multiplexer or multiplexing the information onto wideband frequency channels;
   a low pass filter;
   a local oscillator for upconverting the multiplexed information for transmission;
   a processor for applying a fourier transform to the multiplexed information to bring the information into the time domain for transmission;
   further including, in the receiver of the transceiver;
   a bandpass filter for filtering the received electromagnetic signals;
   a local oscillator for downconverting the received electromagnetic signals to produce output;
   a sampler for sampling the output of the local oscillator to produce sampled signals to the channel estimator;
   a channel estimator for estimating one or both of the amplitude and the phase differential of the received signals to produce as output one or both of an estimated amplitude and an estimated phase differential respectively; and
   a decoder for producing signals from the sampled signals and the output from the channel estimator.

2. The transceiver of claim 1 further including, in the receiver of the transceiver:
   a deprocessor for applying an inverse Fourier transform to the samples output from the sampler.

3. The transceiver of claim 2 further including, in the receiver of the transceiver:
   a power controller before the sampler for monitoring the power of the received signal and for controlling the power of the signal.

4. The transceiver of claim 3 further including, in the transmitter of the transceiver:
   a pre-distorter before the processor, the pre-distorter being connected to the channel estimator, for pre-distorting a signal to be transmitted with one or both of the estimated amplitude or the estimated phase differential.

5. The transceiver of claim 4 in which the power controller is also connected to the pre-distorter for controlling the power of the signal to be transmitted.

6. The transceiver of claim 1 further including: means to modify the received signal with one or both of the estimated amplitude and phase differential respectively.

7. A method for allowing a number of wireless transceiver to exchange frames of information, the method comprising the steps of:
   multiplexing a first frame of information over a number of frequencies within a frequency band at a first transceiver to produce multiplexed information;
   processing the multiplexed information at the first transceiver,
   transmitting the processed information to a second transceiver using a carrier frequency fc;
   receiving the processed information at the second transceiver; and
   processing the processed information at the second transceiver during a first time interval;
   in which the frequency band is formed from a first set of K1 points and a pair of tall slots each having K2 points, each of the points being separated by a frequency range of $\Delta f$, the second transceiver has a maximum expected clock error $\chi T$, where T is the duration of one time domain sample, the information is multiplexed over a number M of levels, and K1 selected such that $2\pi\chi/K1 < \pi/M$, whereby the width of the frequency band is chosen so that neither carrier nor clock recovery is required at the second transceiver.

8. The method claim 7 further including transmitting a second frame of information from the second transceiver to the first transceiver within the same frequency band.

9. The method of claim 7 in which K2 is selected so that the out of band signal is less than a given level.

10. The method of claim 7 in which the first and second transceivers have an expected maximum relative velocity V, the first and second transceivers have carrier frequencies with a frequency offset from each other of of the carrier frequency has a corresponding travelling wavelength $\lambda$ and $\Delta f$ is selected so that $[V/(\lambda \Delta f) + of/\Delta f]$ is less than or equal to a preselected sampling error.

11. The method of claim 7 in which processing the multiplexed information at the second transceiver further includes calculating the mean of the phase shift due to sampling error by summing an estimated phase differential of the received signal.

12. The method of claim 11 in which the mean of the phase shift due to sampling error is divided by K1 and the result removed from the phase differential of the received signal.

* * * * *

UNITED STATES PATENT AND TRADEMARK OFFICE
CERTIFICATE OF CORRECTION

PATENT NO. : 5,282,222
DATED : January 25, 1994
INVENTOR(S) : M. Fattouche et al.

It is certified that error appears in the above-identified patent and that said Letters Patent is hereby corrected as shown below:

Column 19,
Line 14, "or" should read -- for --
Line 21, "fourier" should read -- Fourier --
Line 24, "transceiver;" should read -- transceiver: --

Column 20,
Line 8, "transceiver" should read -- transceivers --
Line 14, "transceiver," should read -- transceiver; --
Line 22, "tall slots" should read -- tail slots --
Line 42, "of of' the" should read -- of fo, the --
Line 44, "+of/$\Delta$f]" should read -- +fo/$\Delta$f] --

Signed and Sealed this

Eighteenth Day of September, 2001

Attest:

NICHOLAS P. GODICI
Attesting Officer   Acting Director of the United States Patent and Trademark Office